(12) United States Patent
Nabeto et al.

(10) Patent No.: US 12,455,204 B2
(45) Date of Patent: Oct. 28, 2025

(54) TACTILE SENSOR

(71) Applicant: OMRON Corporation, Kyoto (JP)

(72) Inventors: Misato Nabeto, Kyoto (JP); Hiroshi Kitajima, Kyoto (JP); Hiroki Koga, Kyoto (JP); Sayaka Doi, Kyoto (JP)

(73) Assignee: OMRON Corporation, Kyoto (JP)

( * ) Notice: Subject to any disclaimer, the term of this patent is extended or adjusted under 35 U.S.C. 154(b) by 274 days.

(21) Appl. No.: 18/020,882

(22) PCT Filed: Jul. 15, 2021

(86) PCT No.: PCT/JP2021/026660
§ 371 (c)(1),
(2) Date: Feb. 10, 2023

(87) PCT Pub. No.: WO2022/038937
PCT Pub. Date: Feb. 24, 2022

(65) Prior Publication Data
US 2023/0324242 A1    Oct. 12, 2023

(30) Foreign Application Priority Data
Aug. 21, 2020  (JP) .................................. 2020-140395

(51) Int. Cl.
*G01L 5/22* (2006.01)
*G01L 1/14* (2006.01)
*G01L 5/165* (2020.01)

(52) U.S. Cl.
CPC .............. *G01L 5/228* (2013.01); *G01L 1/146* (2013.01); *G01L 5/165* (2013.01)

(58) Field of Classification Search
CPC .......... G01L 5/228; G01L 1/146; G01L 5/165
See application file for complete search history.

(56) References Cited

U.S. PATENT DOCUMENTS

| 4,266,263 A | 5/1981 | Haberl et al. |
|---|---|---|
| 4,370,697 A | 1/1983 | Haberl et al. |

(Continued)

FOREIGN PATENT DOCUMENTS

| CN | 204924512 U | 12/2015 |
|---|---|---|
| CN | 106959175 A | 7/2017 |

(Continued)

OTHER PUBLICATIONS

Extended European Search Report dated Jul. 4, 2024, issued in corresponding European Patent Application No. 21858086.8.

(Continued)

*Primary Examiner* — Octavia Hollington
(74) *Attorney, Agent, or Firm* — Morgan, Lewis & Bockius LLP

(57) ABSTRACT

A tactile sensor has an electrostatic capacitance-type sensor portion having a layered structure in which a first electrode layer, an elastic layer, and a second electrode layer are layered. The first electrode layer has plural first electrodes, and the second electrode layer is configured by one or plural second electrodes in a single layer. Two or more of the plural first electrodes are partially-overlapping electrodes that partially overlap with the second electrode as viewed in a normal direction of a contacting surface of the sensor portion. A number of one or plural openings formed in one of the second electrodes, or a number of one or plural island portions formed by one or plural second electrodes, is less than a number of the plural first electrodes.

7 Claims, 20 Drawing Sheets

(56) References Cited

U.S. PATENT DOCUMENTS

| | | | |
|---|---|---|---|
| 5,974,894 | A | 11/1999 | Delatorre |
| 9,222,846 | B2 * | 12/2015 | Lim .................. G01L 1/142 |
| 10,267,690 | B2 * | 4/2019 | Wu .................. G01L 5/165 |
| 10,876,907 | B2 * | 12/2020 | Yoon .................. G01L 1/146 |
| 11,740,147 | B2 * | 8/2023 | Ishizaki .................. G01L 5/165 |
| | | | 73/862.043 |
| 2013/0093437 | A1 | 4/2013 | Koo et al. |
| 2014/0150572 | A1 | 6/2014 | Lim et al. |
| 2014/0174204 | A1 * | 6/2014 | Chen .................. G01L 5/226 |
| | | | 156/182 |
| 2018/0321784 | A1 * | 11/2018 | Park .................. G06V 40/1306 |
| 2018/0326456 | A1 * | 11/2018 | Park .................. G06F 3/0416 |
| 2018/0356299 | A1 | 12/2018 | Watazu et al. |
| 2019/0078946 | A1 | 3/2019 | Zhang et al. |
| 2019/0195704 | A1 | 6/2019 | Taniguchi et al. |
| 2020/0018656 | A1 | 1/2020 | Sawada et al. |
| 2023/0349782 | A1 * | 11/2023 | Nabeto .................. G01L 5/0061 |

FOREIGN PATENT DOCUMENTS

| | | | |
|---|---|---|---|
| CN | 108885149 | A | 11/2018 |
| CN | 109282921 | A | 1/2019 |
| CN | 109642832 | A | 4/2019 |
| CN | 110446912 | A | 11/2019 |
| CN | 114061795 | A * | 2/2022 |
| EP | 2741064 | B1 | 6/2020 |
| JP | S53-112784 | A | 10/1978 |
| JP | 2013-117458 | A | 6/2013 |
| JP | 2015-169532 | A | 9/2015 |
| JP | 6280579 | B2 | 2/2018 |
| JP | 6488414 | B2 | 3/2019 |
| JP | 2019-152599 | A | 9/2019 |
| KR | 10-1209302 | B1 | 12/2012 |
| WO | 2020/097730 | A1 | 5/2020 |

OTHER PUBLICATIONS

International Search Report issued in corresponding International Patent Application No. PCT/JP2021/026660 dated Oct. 5, 2021.
Written Opinion issued in corresponding International Patent Application No. PCT/JP2021/026660 dated Oct. 5, 2021.
Yu et al., "Design of Three-Dimensional Flexible Capacitive Tactile Sensing Array of Floating Electrodes", Instrument Technique and Sensor, No. 5, 2015, 4 pages with English Abstract.
Office Action issued in corresponding Chinese Patent Application No. 202180057537.X, dated Jan. 17, 2025.

* cited by examiner

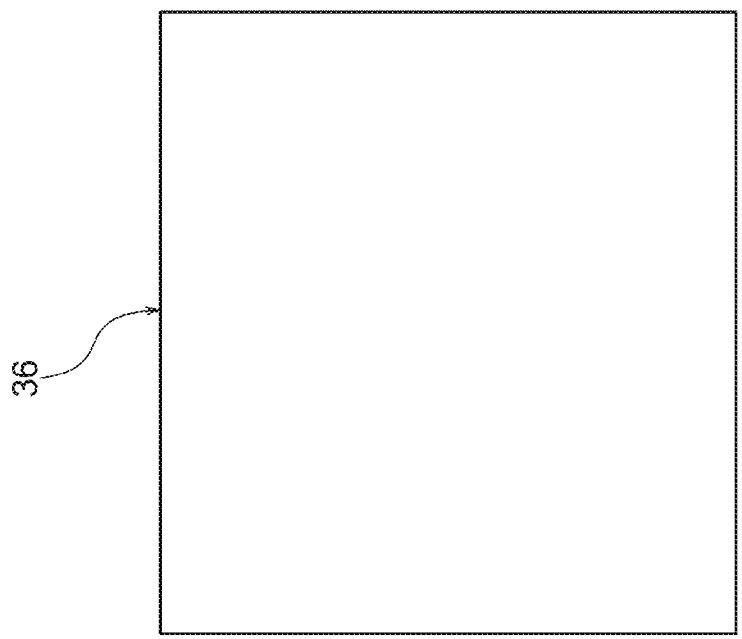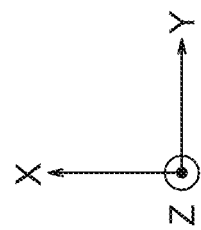

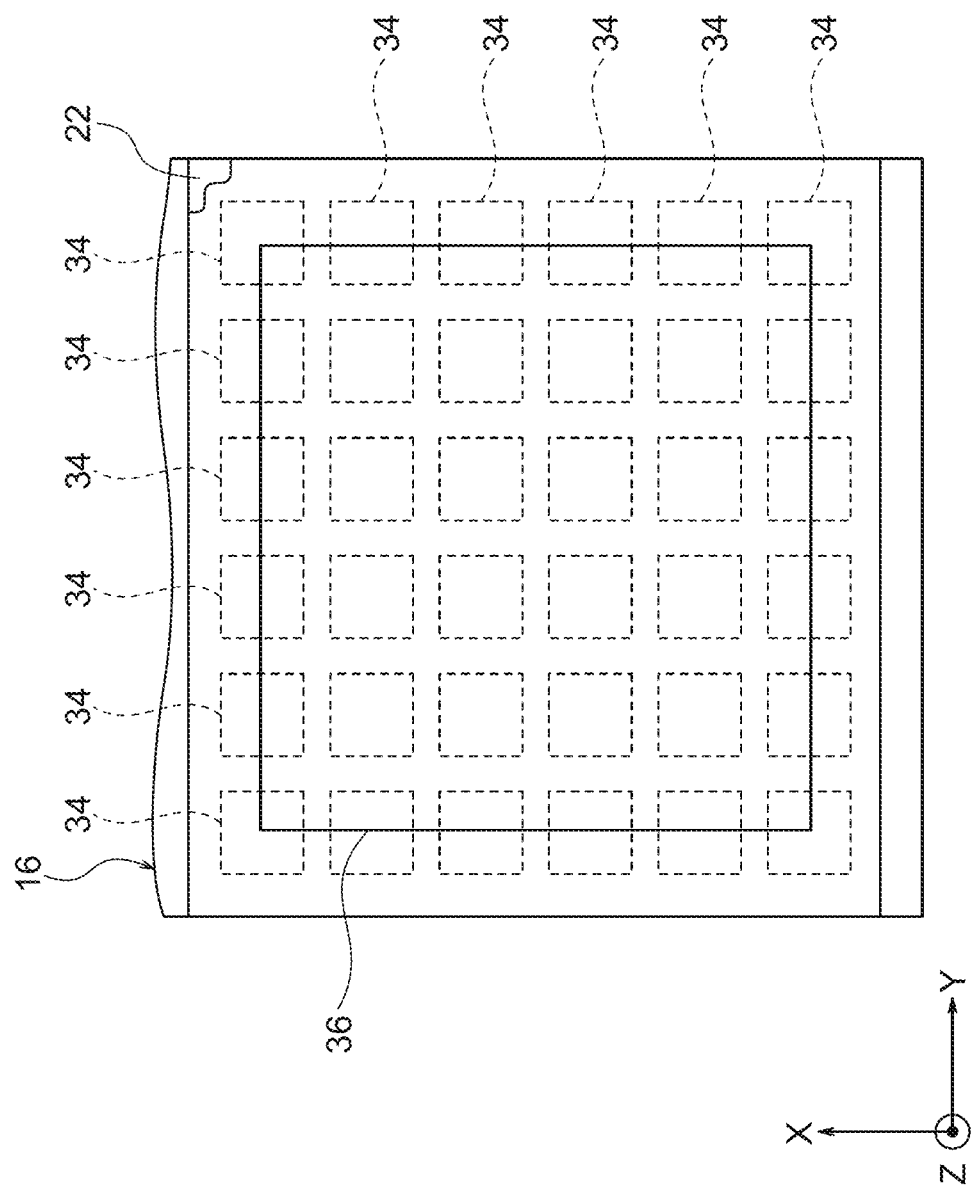

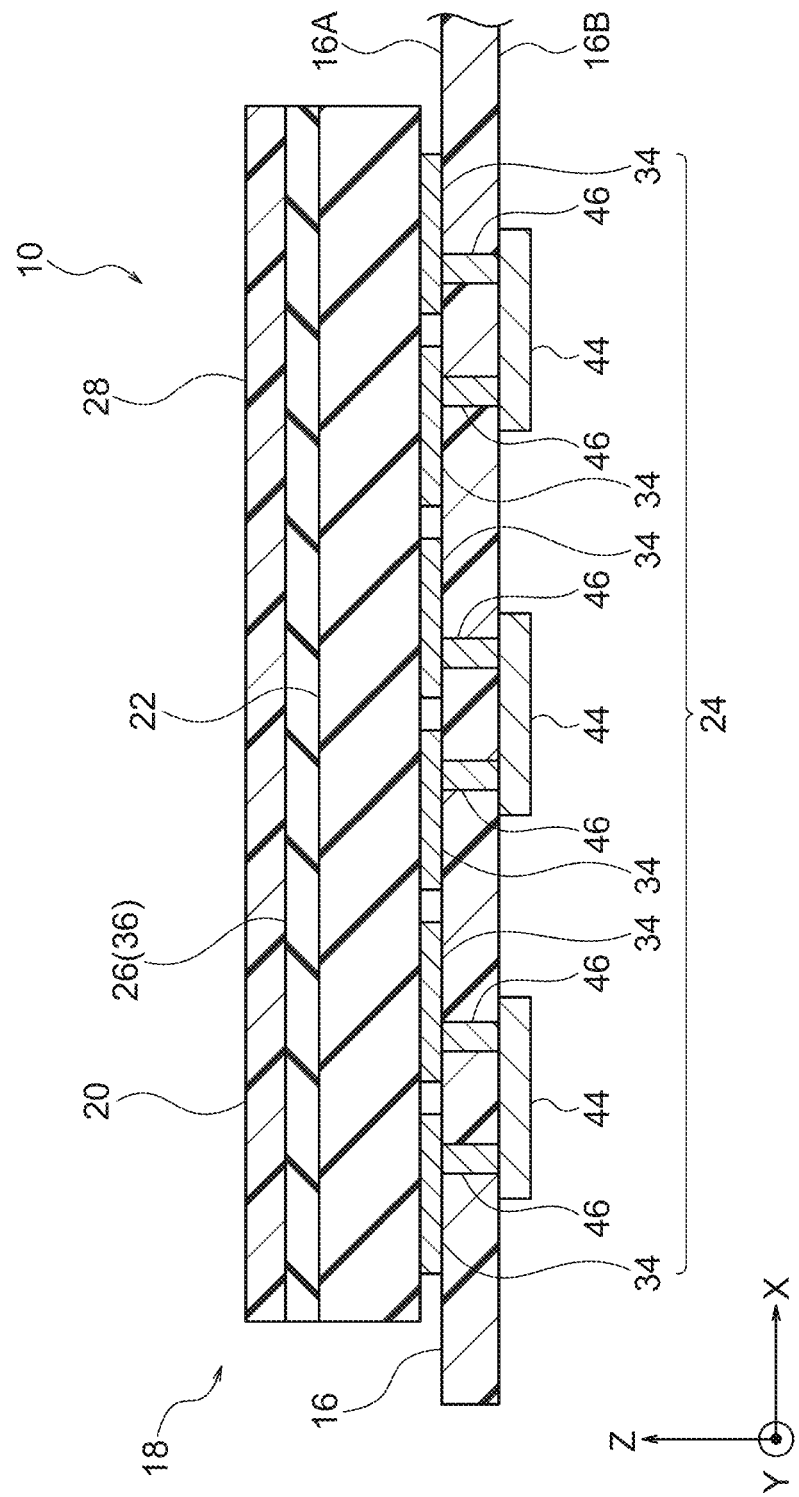

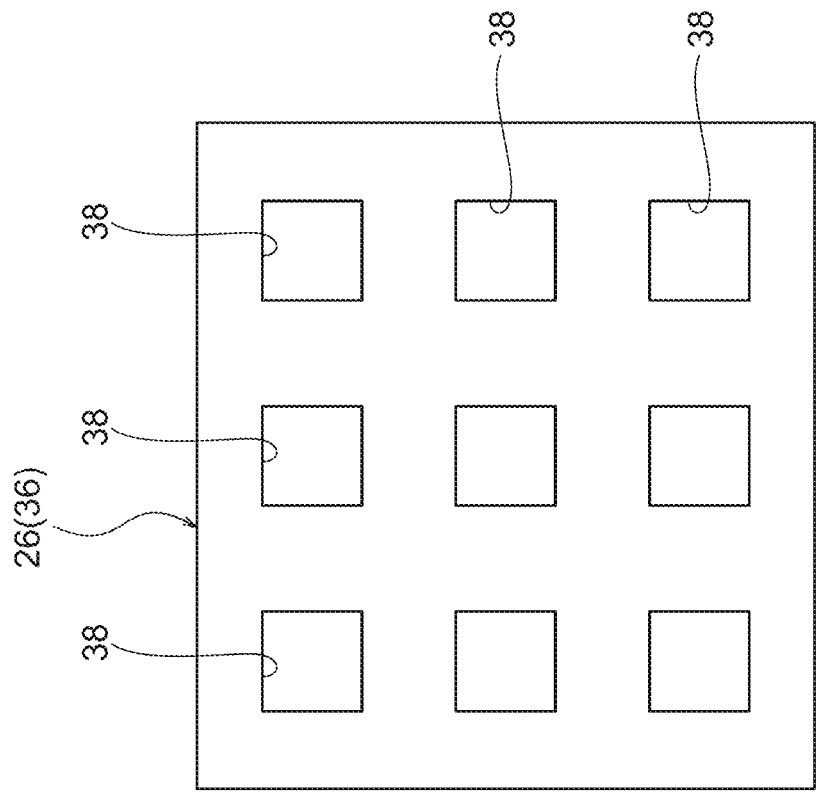

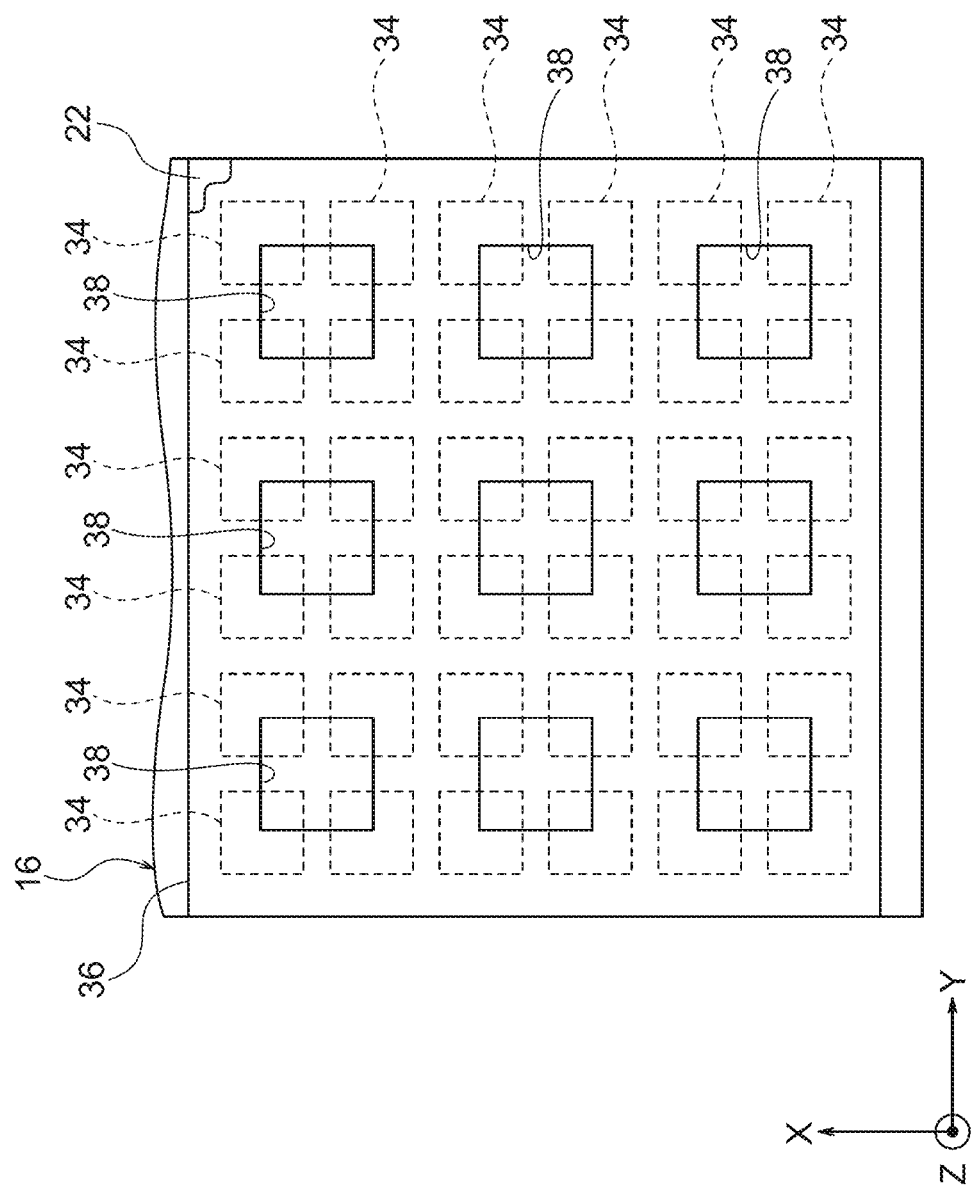

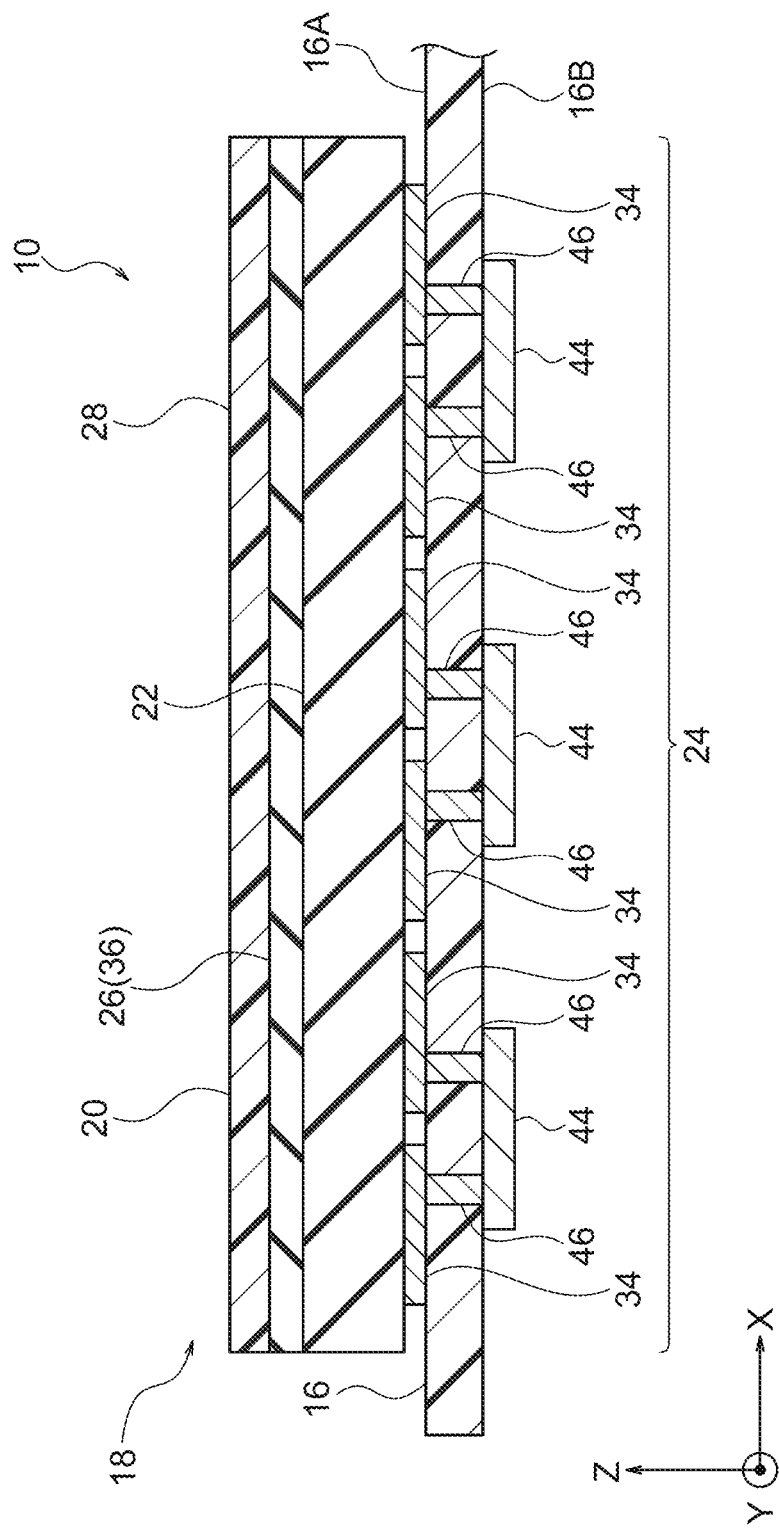

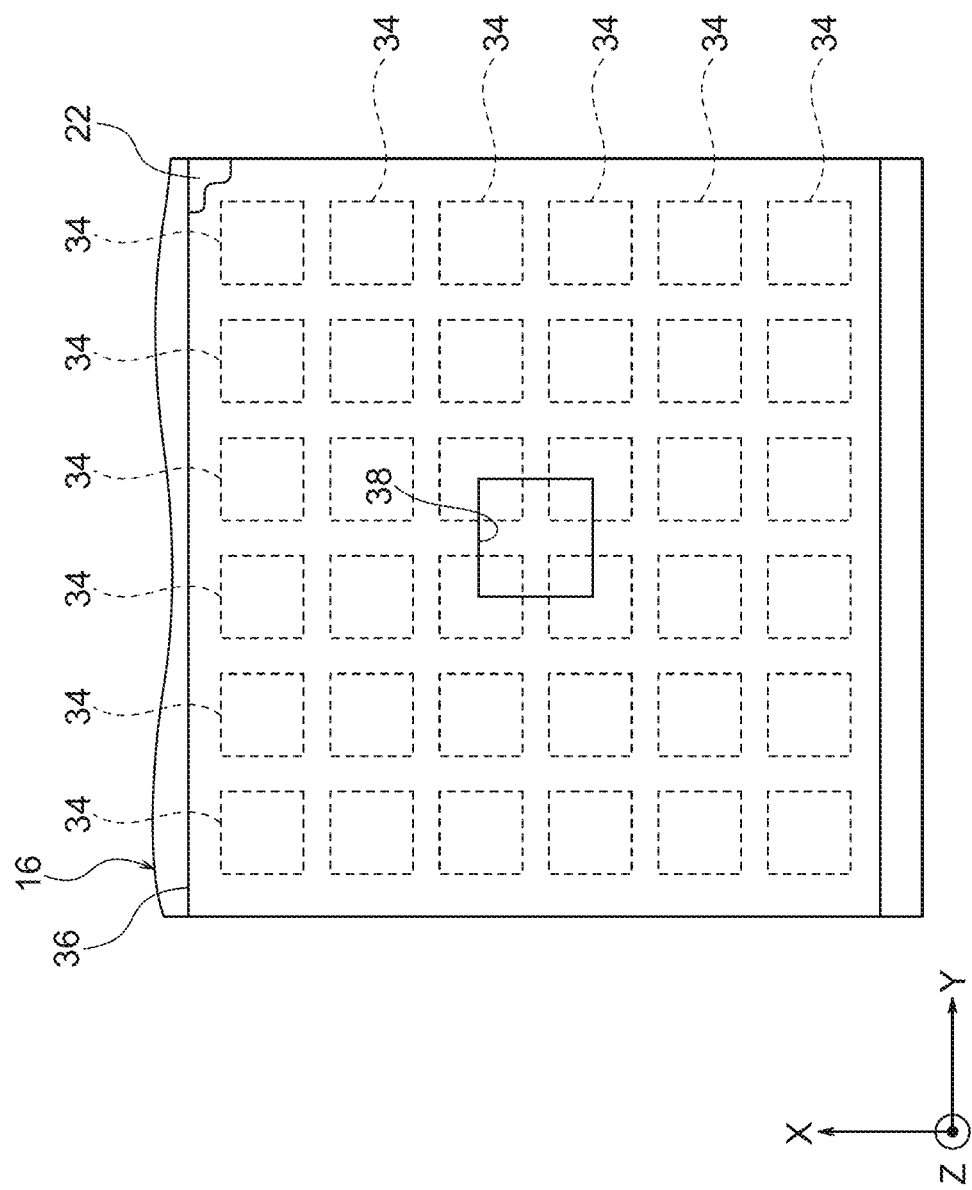

ing forces can be detected and the resolution of the pressure distribution can be ensured, even by a simple structure and simple manufacturing processes.

TACTILE SENSOR

TECHNICAL FIELD

The technique disclosed in the present application relates to a tactile sensor.

BACKGROUND ART

The following techniques, for example, are known as tactile sensors that can sense the pressure distribution and shearing forces of a contacting surface that contacts an object.

Namely, the tactile sensor disclosed in Patent Document 1 has a supporting substrate, a first insulating body, a second insulating body, plural electrodes, plural first strip-shaped electrodes, and plural second strip-shaped electrodes. The supporting substrate, the second insulating body and the first insulating body are layered so as to be lined-up in that order from the side opposite the side at which pressure is inputted to the tactile sensor.

The plural electrodes are provided so as to be spread all over the entirety between the second insulating body and the supporting substrate. The plural first strip-shaped electrodes are provided so as to extend in a first direction at the side of the first insulating body, which side is at the opposite side of the second insulating body. Due to the plural first strip-shaped electrodes extending between, of the plural electrodes, the electrodes that are adjacent to one another in a direction intersecting the first direction, the first strip-shaped electrodes overlap only portions of these adjacent electrodes respectively as viewed in plan view.

The plural second strip-shaped electrodes are provided between the first insulating body and the second insulating body, so as to extend in a second direction that intersects the first direction. Due to the plural second strip-shaped electrodes extending between, of the plural electrodes, the electrodes that are adjacent to one another in a direction intersecting the second direction, the second strip-shaped electrodes overlap only portions of these adjacent electrodes respectively as viewed in plan view.

The tactile sensor is connected to an electrostatic capacitance measuring circuit. The electrostatic capacitance measuring circuit can detect the electrostatic capacitances that are generated between the electrodes and the first strip-shaped electrodes that overlap those electrodes as viewed in plan view. Further, the electrostatic capacitance measuring circuit can detect the electrostatic capacitances that are generated between the electrodes and the second strip-shaped electrodes that overlap those electrodes as viewed in plan view.

The tactile sensor disclosed in Patent Document 2 has a first substrate, a second substrate, and a dielectric. The first substrate has plural first electrodes. The second substrate has plural second electrodes that correspond respectively to the plural first electrodes. The dielectric is provided between the first substrate and the second substrate.

A second electrode that corresponds to any one first electrode among the plural first electrodes is disposed so as to be offset in one direction within the second substrate with respect to the any one first electrode. Another second electrode, which corresponds to another first electrode that is adjacent to the any one first electrode, is disposed so as to be offset in another direction within the second substrate with respect to the another first electrode.

The plural first electrodes correspond one-to-one to the plural second electrodes. The plural first electrodes are disposed so as to be apart from one another, and the plural second electrodes are disposed so as to be apart from one another.

PRIOR ART DOCUMENTS

Patent Documents

Patent Document 1: Japanese Patent No. 6280579
Patent Document 2: Japanese Patent No. 6488414

SUMMARY OF INVENTION

Technical Problem

In the tactile sensor disclosed in Patent Document 1, facing electrodes that face the plural electrodes are two-layer structures of the plural first strip-shaped electrodes and the plural second strip-shaped electrodes. Therefore, the structure of the tactile sensor is complex, and the processes of manufacturing the tactile sensor also are complex.

In the tactile sensor disclosed in Patent Document 2, the plural first electrodes correspond one-to-one to the plural second electrodes. Further, in order to detect shearing forces, the plural first electrodes are disposed so as to be apart from one another, and the plural second electrodes as well are disposed so as to be apart from one another. Accordingly, the intervals between the plural first electrodes are large, and the intervals between the plural second electrodes are large. Therefore, the numbers of the plural first electrodes and the plural second electrodes cannot be increased, and the resolution of the pressure distribution decreases.

Accordingly, there is room for improvement in order to be able to detect shearing forces and ensure the resolution of the pressure distribution, even by a simple structure and simple manufacturing processes.

An object of one aspect of the technique disclosed in the present application is to obtain a tactile sensor that can detect shearing forces and ensure the resolution of the pressure distribution, even by a simple structure and simple manufacturing processes.

Solution to Problem

In order to achieve the above-described object, in accordance with one aspect of the technique disclosed in the present application, there is provided a tactile sensor comprising an electrostatic capacitance-type sensor portion having a contacting surface that contacts an object, and having a layered structure in which an elastic layer, and a first electrode layer and a second electrode layer positioned at respective sides of the elastic layer with the elastic layer sandwiched therebetween, are layered in a normal direction of the contacting surface, wherein the first electrode layer has a plurality of first electrodes, the second electrode layer is configured by one or a plurality of second electrodes in a single layer, two or more of the plurality of first electrodes are partially-overlapping electrodes that partially overlap with the second electrode as viewed in the normal direction, and a number of one or a plurality of openings formed in one of the second electrodes, or a number of one or a plurality of island portions formed by one or a plurality of the second electrodes, is less than a number of the plurality of first electrodes.

Advantageous Effects of Invention

In accordance with the tactile sensor relating to one aspect of the technique disclosed in the present application, shearing forces can be detected, and the resolution of the pressure distribution can be ensured, even by a simple structure and simple manufacturing processes.

BRIEF DESCRIPTION OF DRAWINGS

FIG. 13 is a plan view of the second electrode layer of FIG. 12.

FIG. 14 is a plan view illustrating a state in which the second electrode and the elastic layer and the substrate of FIG. 12 are superposed.

FIG. 15 is a vertical sectional view of the tactile sensor relating to a third embodiment.

FIG. 16 is a plan view of the second electrode layer of FIG. 15.

FIG. 17 is a plan view illustrating a state in which the second electrode and the elastic layer and the substrate of FIG. 15 are superposed.

FIG. 18 is a vertical sectional view of the tactile sensor relating to a fourth embodiment.

FIG. 20 is a plan view illustrating a state in which the second electrode and the elastic layer and the substrate of FIG. 18 are superposed.

DESCRIPTION OF EMBODIMENTS

An embodiment of the technique disclosed in the present application is described in detail hereinafter with reference to the appended drawings.

Example of Robot System 100

First, an overview of an example of a robot system 100 is described.

Figure 1:
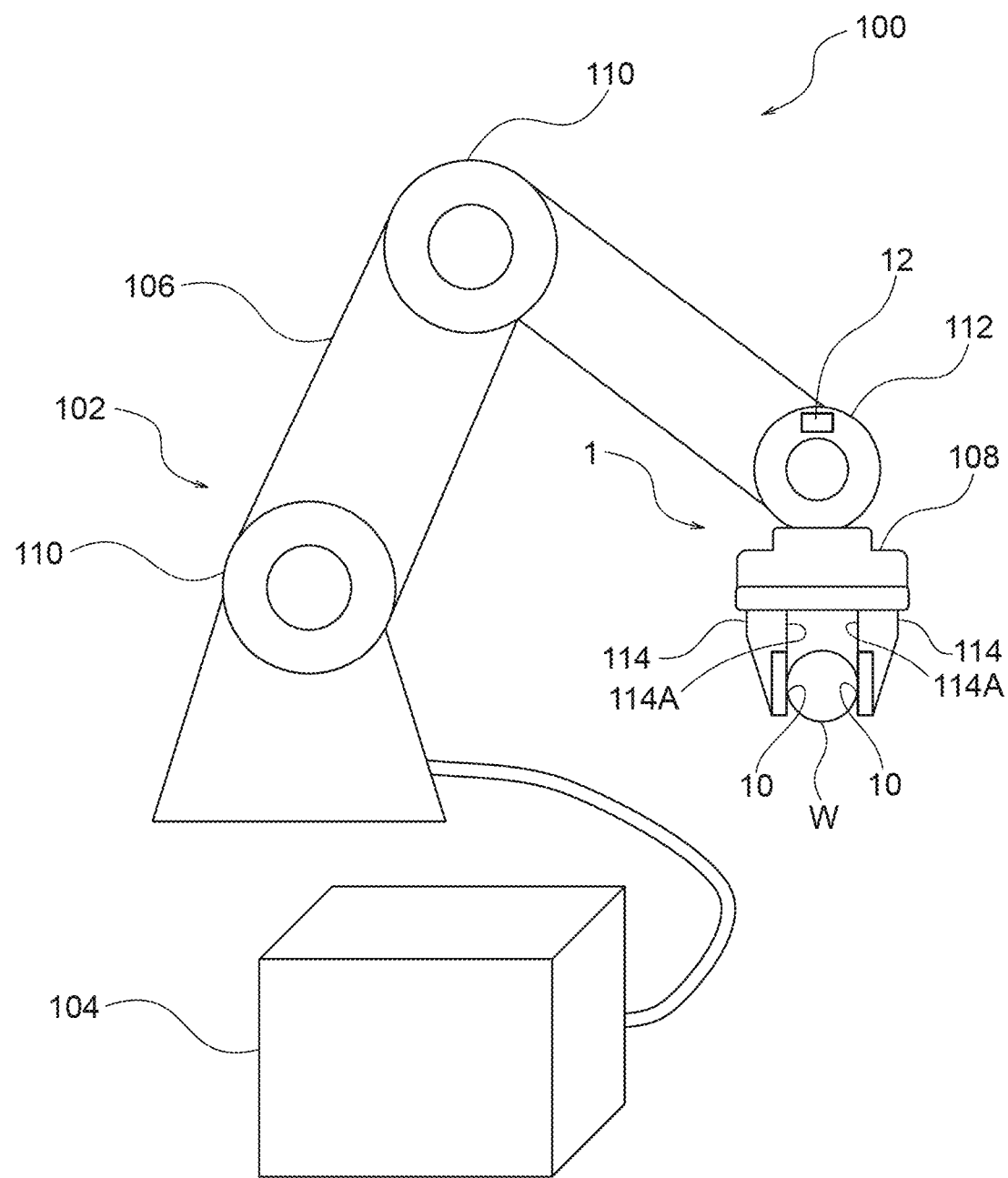
FIG. 1 is a perspective view illustrating an example of a robot system.

FIG. 1 is a perspective view illustrating an example of a robot system 100. The robot system 100 has a robot 102 and a controller 104. The robot 102 is an articulated robot for example, and has a robot arm 106 and a robot hand 108. The robot arm 106 has plural joint portions 110. The robot hand 108 is provided at the distal end portion of the robot arm 106. The robot hand 108 is connected to the distal end portion of the robot arm 106 via a wrist joint portion 112.

A pair of grasping portions 114 are provided at the robot hand 108. The pair of grasping portions 114 are disposed so as to face one another. The pair of grasping portions 114 approach and move away from one another in the direction in which they face one another, due to the driving of an unillustrated driving section. When the pair of grasping portions 114 move in directions of approaching one another in a state in which a workpiece W is disposed therebetween, the workpiece W is grasped by the pair of grasping portions 114.

The controller 104 controls the robot 102, and is electrically connected to the robot 102. In FIG. 1, as an example, the controller 104 is connected to the robot 102 by a wire, but the controller 104 may be wirelessly connected to the robot 102.

Example of Tactile Sensing System 1

An overview of an example of a tactile sensing system 1 is described next.

The tactile sensing system 1 is installed in the robot system 100. The tactile sensing system 1 has a pair of tactile sensors 10 and an output section 12. The pair of tactile sensors 10 are provided respectively at mutually facing surfaces 114A of the pair of grasping portions 114. The pair of tactile sensors 10 are provided at positions that contact the workpiece W in the state in which the workpiece W is grasped by the pair of grasping portions 114, i.e., as an example, are provided at the portions, which face one another, of the distal end portions of the pair of grasping portions 114.

The output section 12 is electrically connected to the pair of tactile sensors 10. The output section 12 may be connected to the pair of tactile sensors 10 by wires, or may be wirelessly connected to the pair of tactile sensors 10. As described in detail later, the output section 12 has the functions of carrying out various types of processings on the basis of data outputted from the pair of tactile sensors 10, and outputting data that is based on the results of these processings to the controller 104. The output section 12 is provided at the wrist joint portion 112 as an example.

Figure 2:
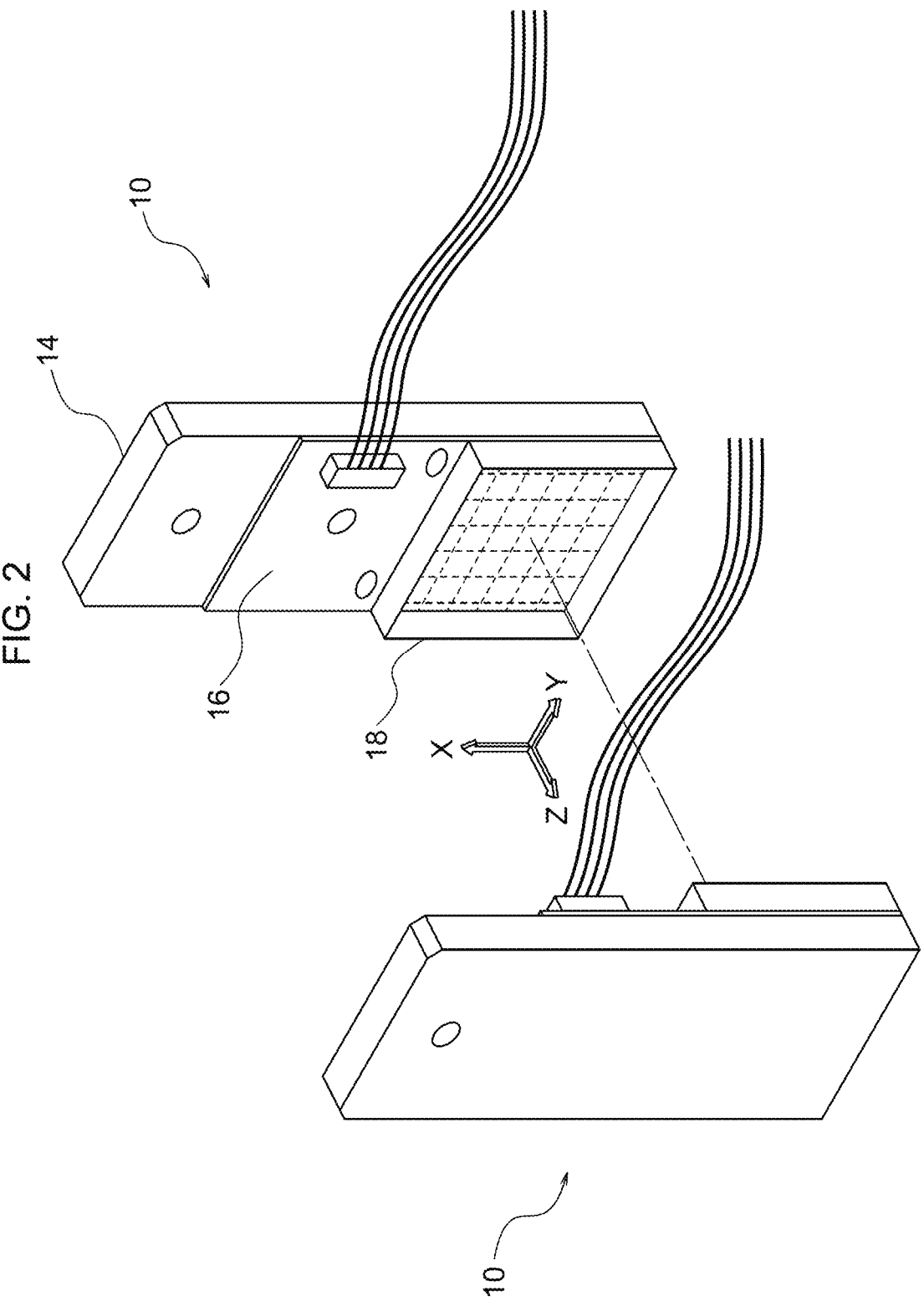
FIG. 2 is a perspective view illustrating an example of a pair of tactile sensors of FIG. 1.

FIG. 2 is a perspective view illustrating an example of the pair of tactile sensors 10 of FIG. 1. As an example, the pair of tactile sensors 10 have plane symmetry in the direction of facing one another. The X-axis direction corresponds to a first direction that is orthogonal to the direction in which the pair of tactile sensors 10 face one another. The Y-axis direction corresponds to a second direction that is orthogonal to the direction in which the pair of tactile sensors 10 face one another. The Z-axis direction corresponds to the direction in which the pair of tactile sensors 10 face one another. The X-axis direction is orthogonal to the Y-axis direction. As an example, the X-axis direction corresponds to the length direction of the tactile sensors 10, and the Y-axis direction corresponds to the width direction of the tactile sensors 10.

The tactile sensor 10 has a supporting plate 14, a substrate 16, and a sensor portion 18. The supporting plate 14 is configured by a body that is separate from the above-described grasping portion 114 (see FIG. 1), and is fixed to the grasping portion 114. The supporting plate 14 may be structured integrally with the grasping portion 114. The substrate 16 is fixed to the supporting plate 14, and the sensor portion 18 is provided on the substrate 16. Details of the sensor portion 18 are described later.

First through fourth embodiments of the tactile sensing system 1 are described next.

First Embodiment

Figure 3:
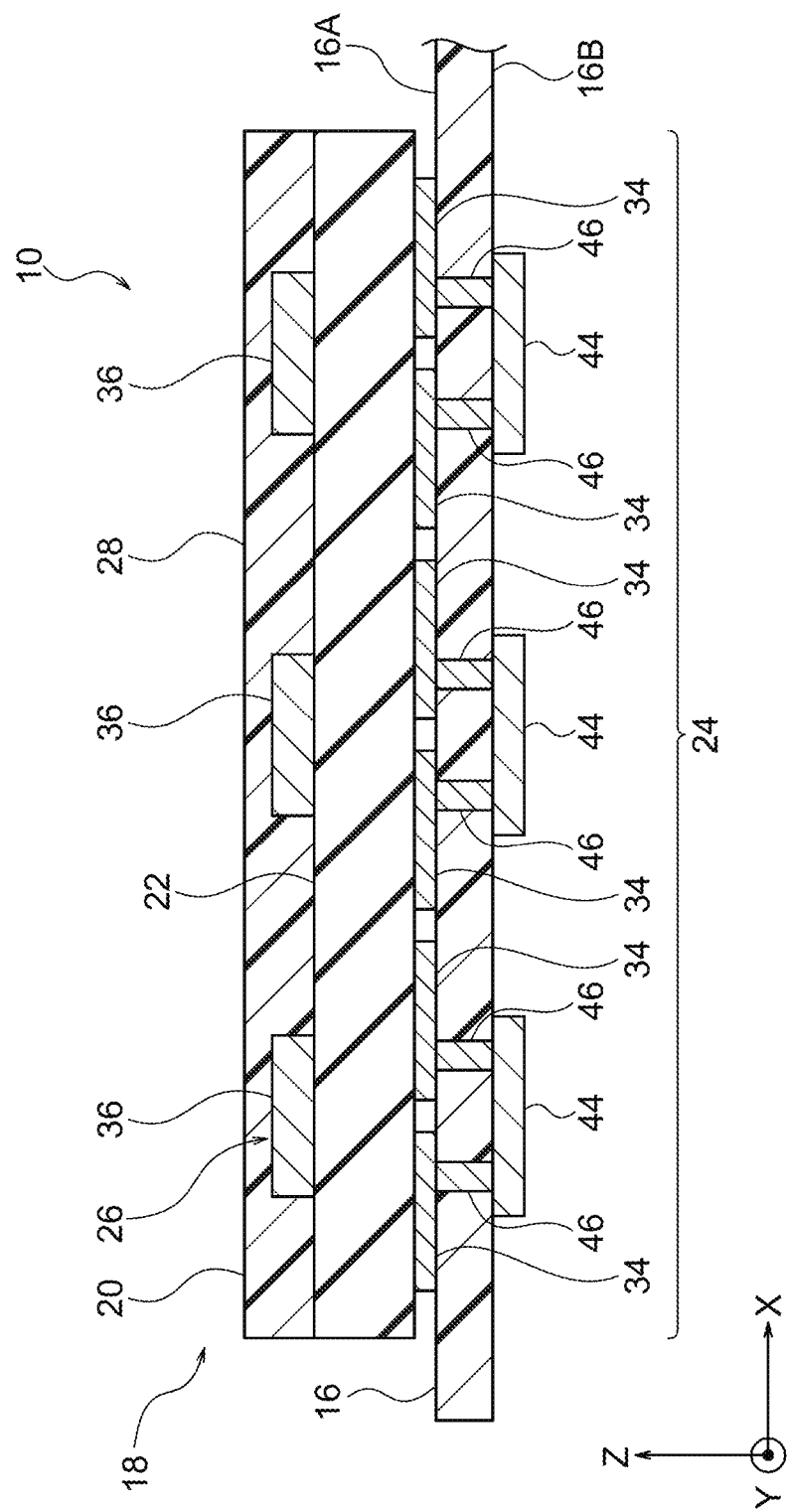
FIG. 3 is a vertical sectional view of a tactile sensor relating to a first embodiment.

A first embodiment is described first.
(Structure of Tactile Sensor 10)
FIG. 3 is a vertical sectional view of the tactile sensor 10 relating to the first embodiment.

The tactile sensor 10 relating to the first embodiment has the sensor portion 18 and the substrate 16.

The sensor portion 18 is an electrostatic capacitance-type sensor. More specifically, this sensor portion 18 is a self-capacitance-type sensor, and has a layered structure in which plural layers are layered. Namely, the sensor portion 18 has, as the plural layers, an insulating layer 20, an elastic layer 22, a first electrode layer 24 and a second electrode layer 26. The first electrode layer 24 and the second electrode layer 26 are positioned at the respective sides of the elastic layer 22 so as to sandwich the elastic layer 22 therebetween.

The insulating layer 20 is positioned at the side of the second electrode layer 26, which side is opposite the elastic layer 22. The insulating layer 20 forms the surface layer portion of the sensor portion 18. The obverse of the insulating layer 20 is formed as a contacting surface 28 that contacts the workpiece W (see FIG. 1). Note that the insulating layer 20 may be omitted. In a case in which the insulating layer 20 is omitted, the obverse of the second electrode layer 26, or of a surface layer formed on the second electrode layer 26, is the contacting surface 28.

The elastic layer 22 is a dielectric. The elastic layer 22 is flexible and elastic. The elastic layer 22 is formed by a gel for example. The insulating layer 20, the elastic layer 22, the first electrode layer 24 and the second electrode layer 26 are layered in the Z-axis direction. The Z-axis direction corresponds to the normal direction of the contacting surface 28. The insulating layer 20, the elastic layer 22, the first electrode layer 24 and the second electrode layer 26 are adhered to one another by an adhesive or the like for example. In order to increase the adhesive strength of the sensor portion 18 overall, it is preferable that the insulating layer 20 be a size that covers the entire surface of the second electrode layer 26.

The first electrode layer 24 has plural first electrodes 34. The plural first electrodes 34 are formed on a first surface 16A that is at the sensor portion 18 side of the substrate 16. Plural electrostatic capacitance detecting ICs (Integrated Circuits) 44 are packaged on a second surface 16B, which is at the side opposite the sensor portion 18, of the substrate 16. The plural first electrodes 34 and the plural electrostatic capacitance detecting ICs 44 are connected by through-hole vias 46 that extend in the plate thickness direction of the substrate 16.

Figure 4:
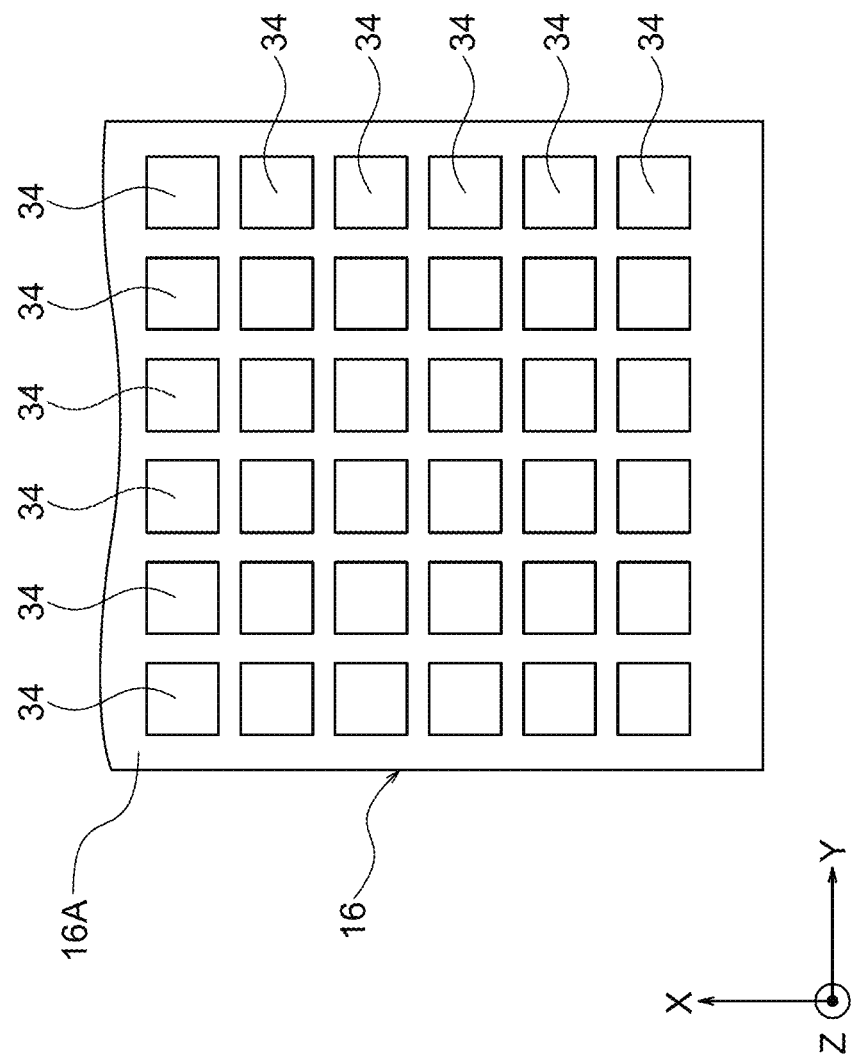
FIG. 4 is a plan view of a substrate of FIG. 3.

FIG. 4 is a plan view of the substrate 16 of FIG. 3. The plural first electrodes 34 that are formed on the first surface 16A of the substrate 16 are arrayed in the form of a matrix along the X-Y plane. Namely, the plural first electrodes 34 are arrayed with the X-axis direction being the length direction and the Y-axis direction being the width direction. The X-Y plane is the plane that is parallel to the aforementioned contacting surface 28 (see FIG. 2).

The plural first electrodes 34 are independent of one another. The plural first electrodes 34 have the same shape. As an example, the plural first electrodes 34 are formed in square shapes as viewed in plan view. Viewing in plan view corresponds to viewing in the Z-axis direction. As an example, the plural first electrodes 34 are arrayed such that there are six thereof in the X-axis direction and six thereof in the Y-axis direction. Namely, the number of the plural first electrodes 34 is 36. These plural first electrodes 34 are arrayed at uniform intervals in the X-axis direction and the Y-axis direction, respectively.

Figure 5:
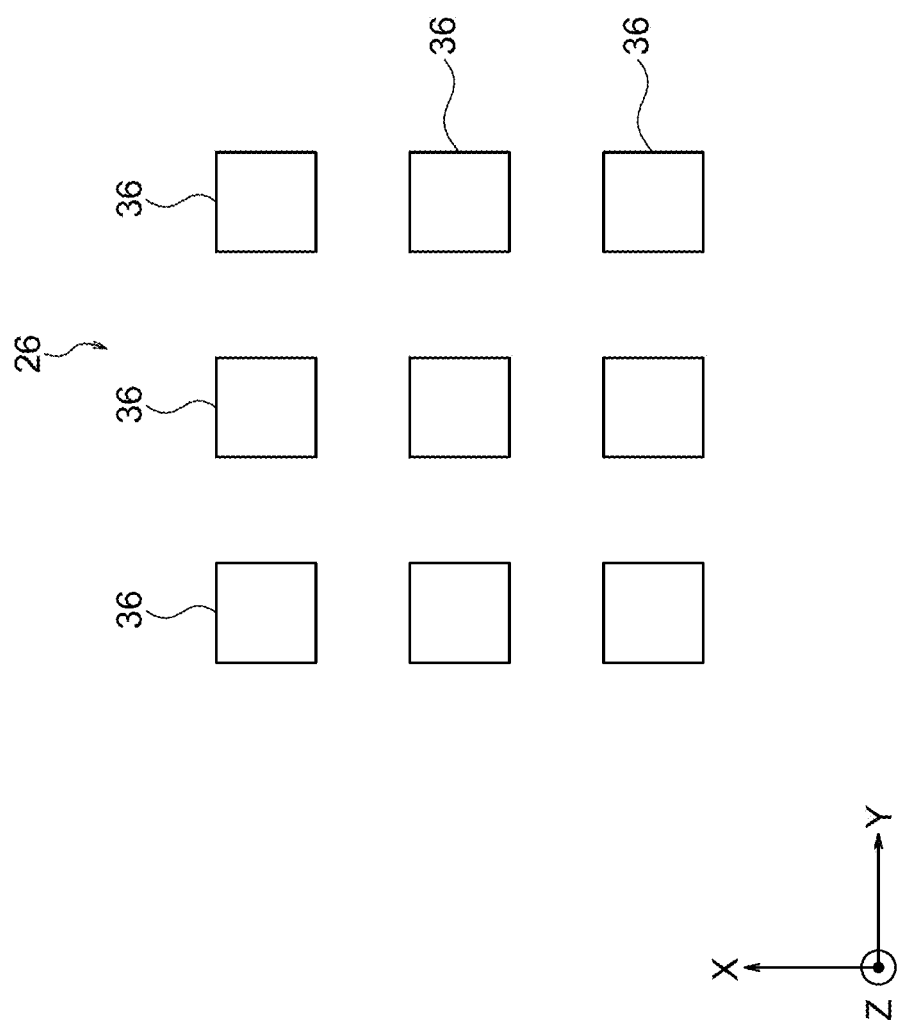
FIG. 5 is a plan view of a second electrode layer of FIG. 3.

FIG. 5 is a plan view of the second electrode layer 26 of FIG. 3. The second electrode layer 26 is configured by plural second electrodes 36 in a single layer. The plural second electrodes 36 are formed of a conductive rubber for example. The plural second electrodes 36 are respectively formed in the shapes of flat plates. The plural second electrodes 36 may be connected to the ground of the substrate 16, or may be floating with respect to ground.

The plural second electrodes 36 form plural islands that are independent of one another. The plural second electrodes 36 are arrayed in the form of a matrix along the X-Y plane. Namely, the plural second electrodes 36 are arrayed with the X-axis direction being the length direction and the Y-axis direction being the width direction.

The plural second electrodes 36 are the same shape. As an example, the plural second electrodes 36 are respectively formed in square shapes as viewed in plan view. The number of the plural second electrodes 36 is less than the number of the above-described, plural first electrodes 34 (see FIG. 4). As an example, the plural second electrodes 36 are arrayed such that there are three thereof in the X-axis direction and three thereof in the Y-axis direction. Namely, the number of the plural second electrodes 36 is nine. These plural second electrodes 36 are arrayed at uniform intervals in the X-axis direction and the Y-axis direction, respectively.

Figure 6:
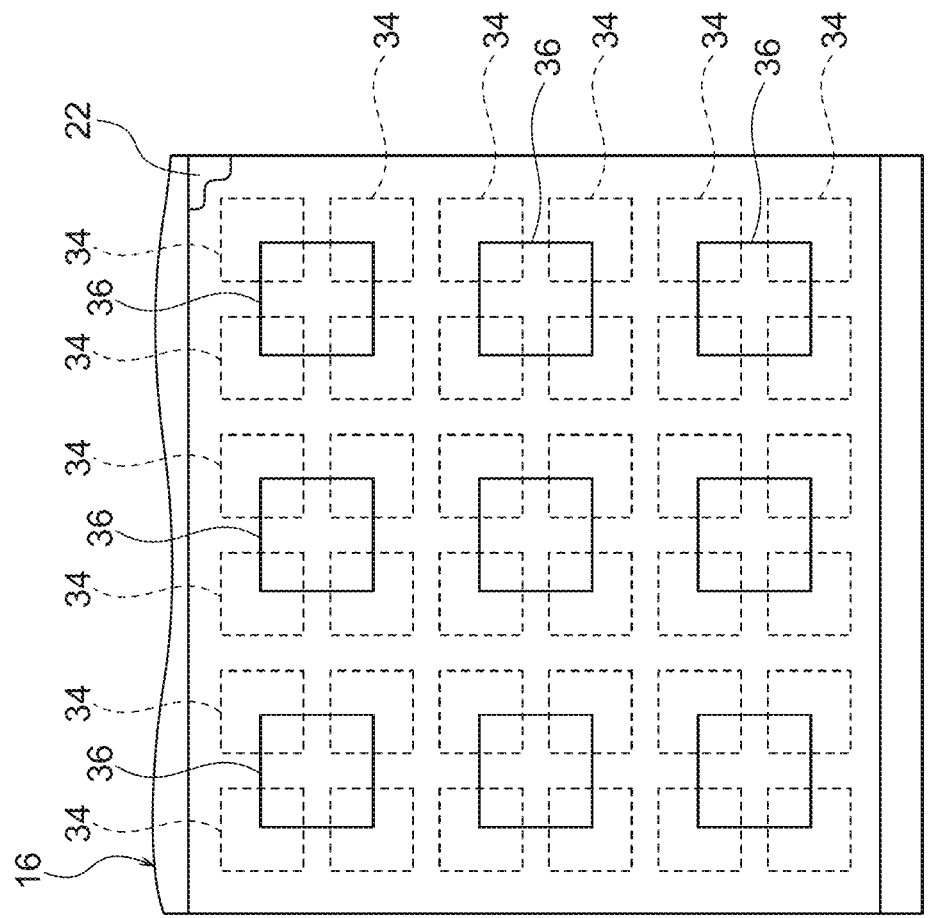
FIG. 6 is a plan view illustrating a state in which second electrodes and an elastic layer and the substrate of FIG. 3 are superposed.

FIG. 6 is a plan view illustrating a state in which the plural second electrodes 36 and the elastic layer 22 and the substrate 16 of FIG. 3 are superposed. The plural second electrodes 36 are disposed so as to be superposed with all of the plural first electrodes 34 as viewed in plan view. As viewed in plan view, the plural second electrodes 36 are respectively formed so as to partially overlap with the respective, four first electrodes 34 that are adjacent in the X-axis direction and the Y-axis direction, among the plural first electrodes 34. As viewed in plan view, the respective second electrodes 36 are positioned at the central portions of the four first electrodes 34, and partially overlap with these four first electrodes 34.

In this way, in the first embodiment, all of the plural first electrodes 34 partially overlap with the plural second electrodes 36. In this first embodiment, all of the plural first electrodes 34 correspond to an example of the "plurality of partially-overlapping electrodes that partially overlap with the plurality of second electrodes", and the plural signals that are outputted from the plural first electrodes 34 correspond to an example of the "plurality of partially-overlapping electrode signals".

In the first embodiment, all of the plural first electrodes 34 correspond to an example of the "plurality of partially-overlapping electrodes that partially overlap with the second electrode", and the plural signals that are outputted from the plural first electrodes 34 correspond to an example of the "plurality of partially-overlapping electrode signals".

Electrostatic capacitance C[F] between the first electrode 34 and the second electrode 36 is determined by the following formula.

$$C = \varepsilon \times A / d$$

$\varepsilon$ is the dielectric constant [Fm$^{-1}$] of the elastic layer 22, A is the surface area [m$^2$] over which the first electrode 34 and the second electrode 36 overlap one another as viewed in plan view, and d is the distance [m] between the first electrode 34 and the second electrode 36 along the Z-axis direction.

At this sensor portion 18, when pressure is applied to the contacting surface 28, and the distance d between each first electrode 34 and the second electrode 36 changes, the electrostatic capacitance C changes in accordance with this change in the distance d. Further, at the sensor portion 18, when shearing force is applied to the contacting surface 28, and the surface area A over which each first electrode 34 and the second electrode 36 overlap one another changes, the electrostatic capacitance C changes in accordance with this change in the surface area A.

Note that, although described in detail hereinafter, the pressure that is applied to the contacting surface 28 corresponds to the force that is applied to the contacting surface 28 along the Z-axis direction. Further, the shearing force that is applied to the contacting surface 28 corresponds to the force that is applied to the contacting surface 28 along a direction orthogonal to the Z-axis direction. Directions orthogonal to the Z-axis direction include the X-axis direction, the Y-axis direction, and directions that combine the X-axis direction and the Y-axis direction.

The plural first electrodes 34 are driven by the electrostatic capacitance detecting ICs 44 (see FIG. 3 and FIG. 7) that are described later, and respectively output signals corresponding to the electrostatic capacitances C between the first electrodes 34 and the second electrodes 36. Namely, the sensor portion 18 outputs plural signals that respectively correspond to the plural first electrodes 34. These plural signals are analog signals.

Figure 7:
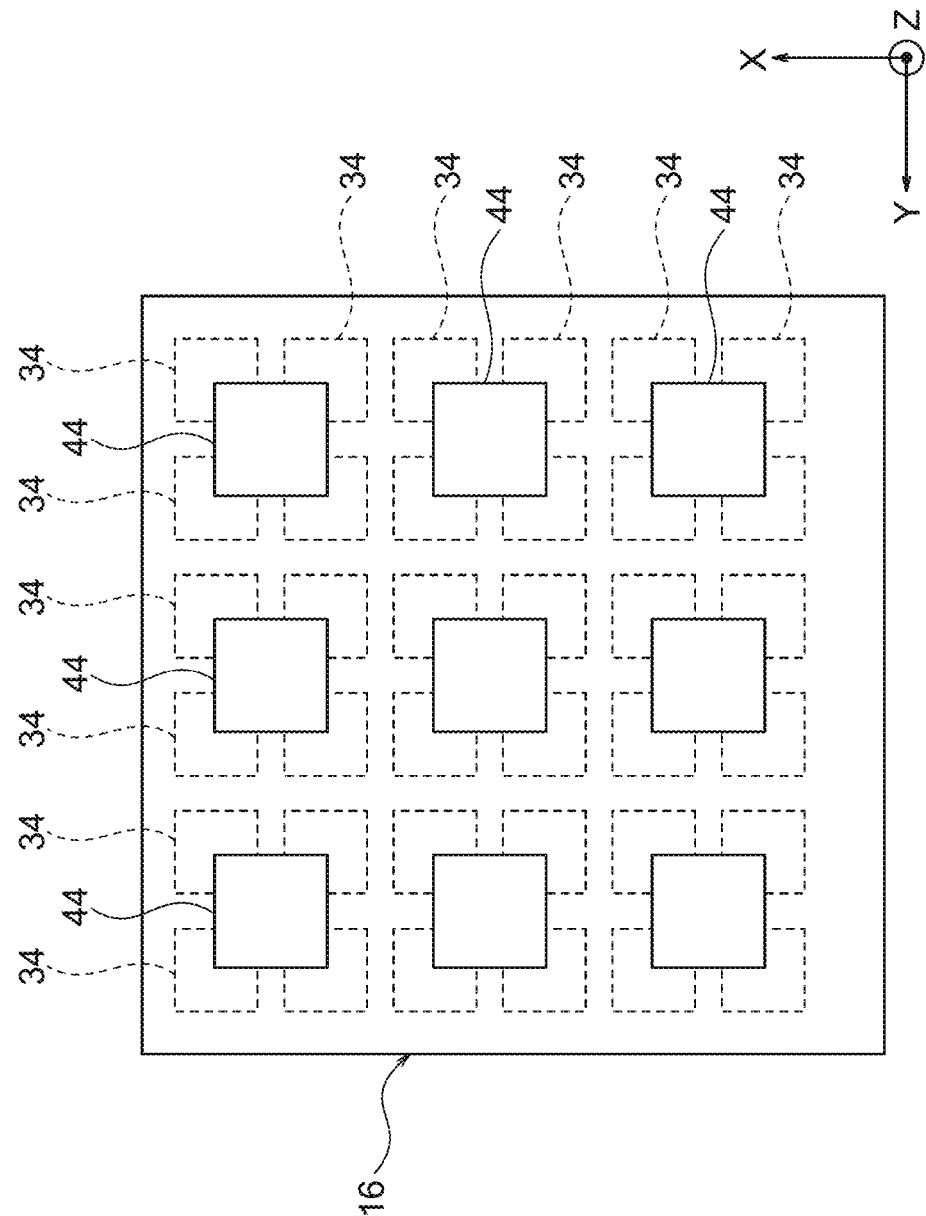
FIG. 7 is a bottom view of the substrate of FIG. 3.

FIG. 7 is a bottom view of the substrate 16 of FIG. 3. The plural electrostatic capacitance detecting ICs 44 are arrayed in the form of a matrix along the X-Y plane. Namely, the plural electrostatic capacitance detecting ICs 44 are arrayed with the X-axis direction being the length direction and the Y-axis direction being the width direction. The plural electrostatic capacitance detecting ICs 44 have the same structure. As an example, the plural electrostatic capacitance detecting ICs 44 are arrayed such that there are three thereof in the X-axis direction and three thereof in the Y-axis direction. Namely, the number of the plural electrostatic capacitance detecting ICs 44 is nine.

To each of the electrostatic capacitance detecting ICs 44 is connected the four first electrodes 34 that overlap that electrostatic capacitance detecting IC as viewed in plan view. Each of the electrostatic capacitance detecting ICs 44 is driven by the four first electrodes 34, and is a structure that can output data corresponding to the signals outputted from those four first electrodes 34.

(Method of Manufacturing Tactile Sensor 10)

Figure 8:
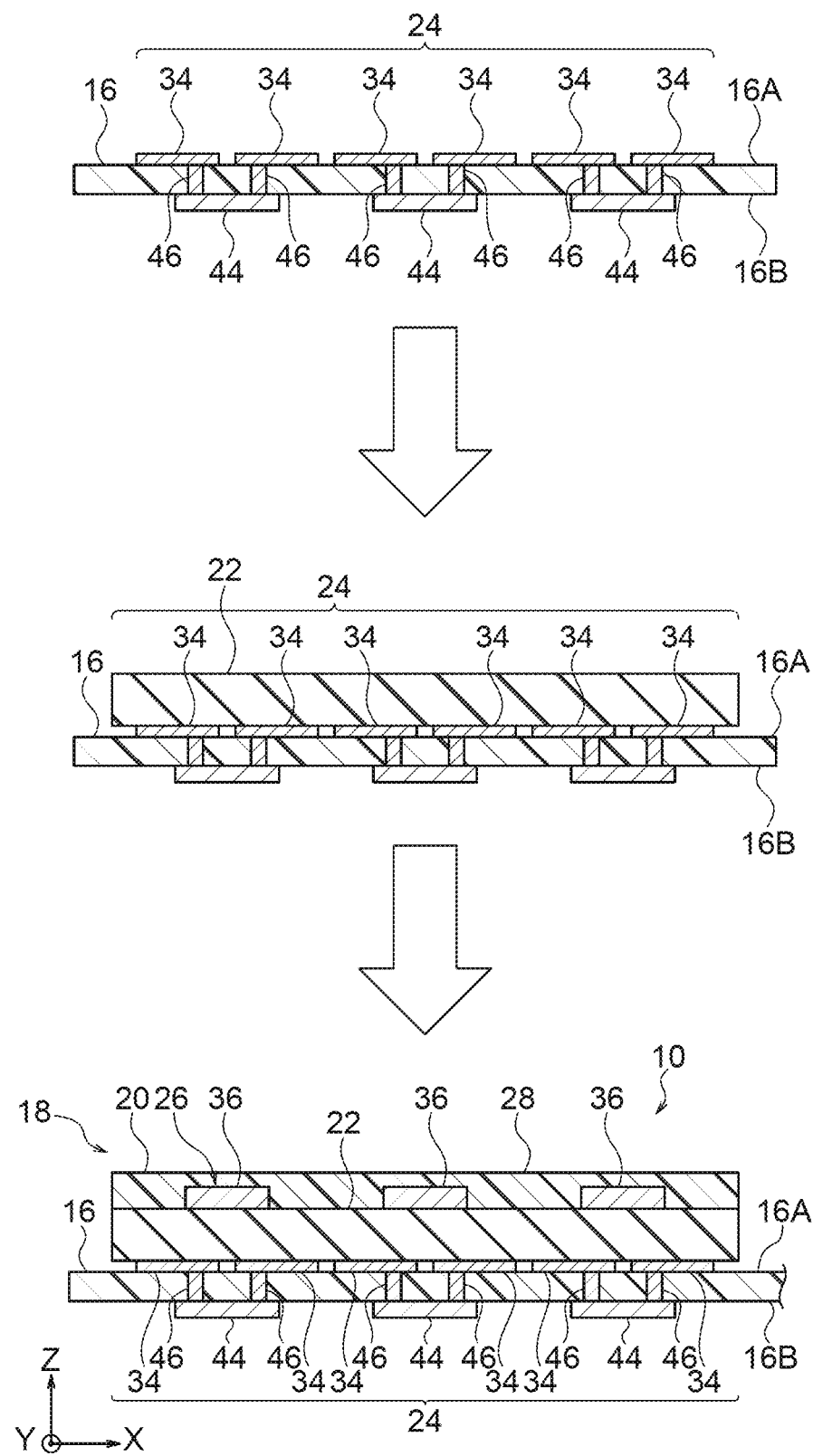
FIG. 8 is a drawing explaining an example of a method of manufacturing the tactile sensor of FIG. 3.

FIG. 8 is a drawing explaining an example of a method of manufacturing the tactile sensor 10 of FIG. 3. The tactile sensor 10 is manufactured by the following procedures for example. Namely, the plural electrostatic capacitance detecting ICs 44 are packaged on the second surface 16B of the substrate 16 at which the plural first electrodes 34 are formed on the first surface 16A by a pattern. The plural through-hole vias 46 are formed in the substrate 16, and the plural electrostatic capacitance detecting ICs 44 are connected to the plural first electrodes 34 via the plural through-hole vias 46.

Next, the elastic layer 22 is layered on the first electrode layer 24 that has the plural first electrodes 34. Further, the second electrode layer 26 that is configured by the plural second electrodes 36 (see FIG. 5) is layered on the elastic layer 22, and moreover, the insulating layer 20 is layered on this second electrode layer 26. The insulating layer 20, the elastic layer 22, the first electrode layer 24 and the second electrode layer 26 are adhered to one another by an adhesive or the like for example. The tactile sensor 10 is manufactured by the above-described procedures.

Note that, as illustrated in FIG. 5, punching processing, cutting processing, cast molding, metal press molding, and the like are examples of processing methods that form plural openings 38 in the second electrodes 36.

(Explanation of Displacements Δx, Δy, Δz)

Figure 9:
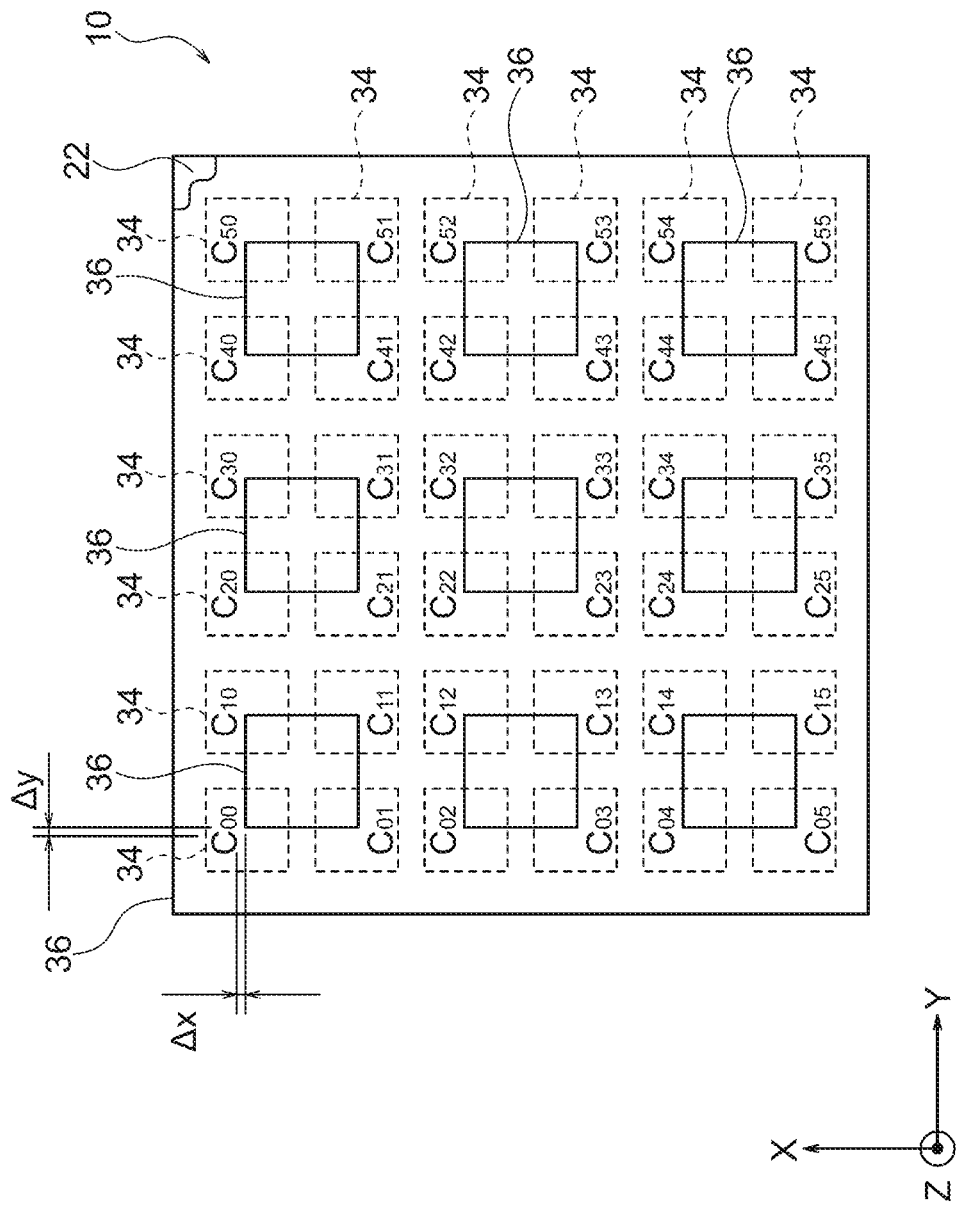
FIG. 9 is a plan view explaining an example of displacement Δx and displacement Δy at the tactile sensor of FIG. 3.

FIG. 9 is a plan view explaining an example of displacement Δx and displacement Δy at the tactile sensor 10 of FIG. 3. Note that, in FIG. 9, electrostatic capacitances $C_{00} \sim C_{55}$ between the respective, plural first electrodes 34 and the second electrodes 36 are illustrated so as to correspond to the plural first electrodes 34, respectively.

Figure 10:
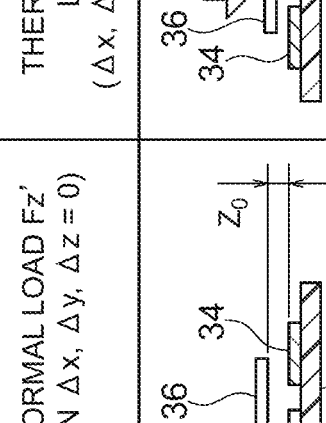
FIG. 10 is a drawing explaining examples of displacement Δx and displacement Δz at the tactile sensor of FIG. 3.

FIG. 10 is a drawing explaining examples of displacement Δx and displacement Δz at the tactile sensor 10 of FIG. 3. In FIG. 10, (A) illustrates a case in which there is no normal load Fz', (B) illustrates a case in which there is the normal load Fz', (C) illustrates a case in which there is shearing force Fx, and (D) illustrates a case in which there is the normal load Fz' and there is the shearing force Fx, respectively.

Figure 11:
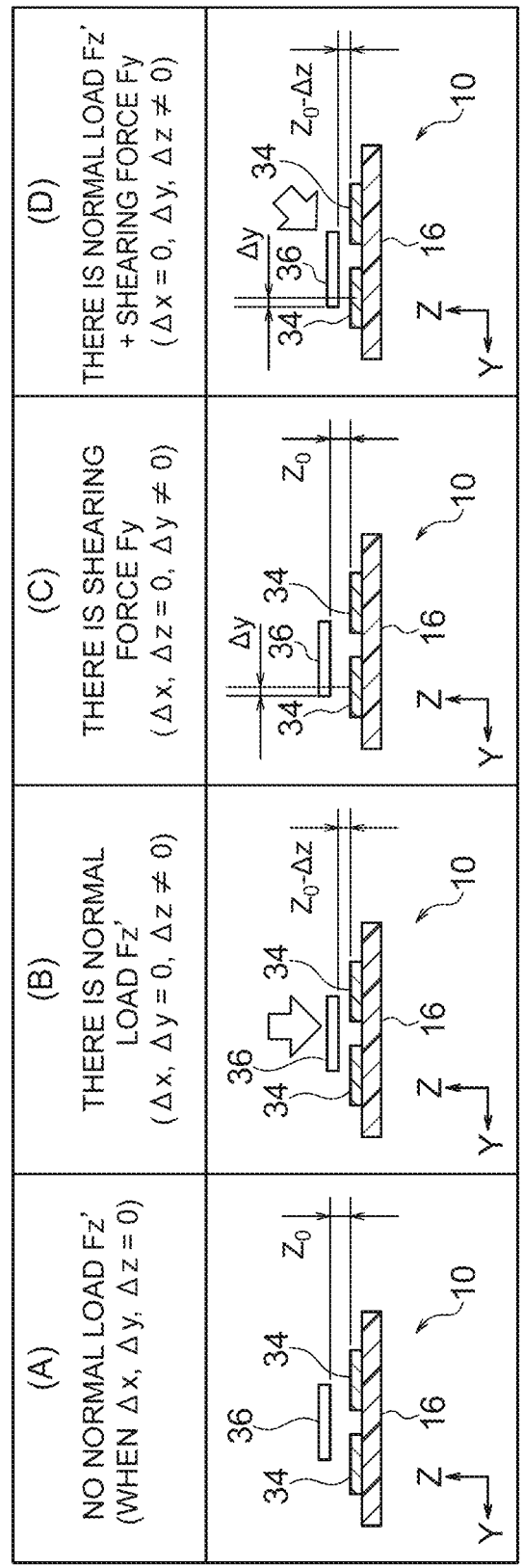
FIG. 11 is a drawing explaining examples of displacement Δy and displacement Δz at the tactile sensor of FIG. 3.

FIG. 11 is a drawing explaining examples of displacement Δy and displacement Δz at the tactile sensor 10 of FIG. 3. In FIG. 11, (A) illustrates a case in which there is no normal load Fz', (B) illustrates a case in which there is the normal load Fz', (C) illustrates a case in which there is shearing force Fy, and (D) illustrates a case in which there is the normal load Fz' and there is the shearing force Fy, respectively.

As illustrated in FIG. 9 and FIG. 10, displacement Δx corresponds to the distance that the second electrode 36 moves along the X-axis direction accompanying application of the shearing force Fx. Similarly, as illustrated in FIG. 9 and FIG. 11, displacement Δy corresponds to the distance that the second electrode 36 moves along the Y-axis direction accompanying application of the shearing force Fy.

As illustrated in FIG. 10 and FIG. 11, distance $Z_0$ corresponds to the distance along the Z-axis direction between the first electrode 34 and the second electrode 36 at the time when the normal load Fz' is not applied. Displacement Δz corresponds to the distance that the second electrode 36 moves along the Z-axis direction toward the first electrode 34 side accompanying application of the normal load Fz'.

Examples of calculating the displacements Δx, Δy, Δz are described hereinafter by using the first electrodes 34, which are adjacent to one another and partially overlap with one of the second electrodes 36, as an example.

(when Normal Load Fz' is not Applied: Δx, Δy, Δz=0)

As illustrated in FIG. 10(A) and FIG. 11(A), when the normal load Fz' is not applied, Δx, Δy, Δz=0, and Formula 1 is established for the first electrodes 34 that are adjacent to one another and partially overlap with the second electrode 36.

$$C_{00\_0} = K1/Z_0$$

$$C_{01\_0} = K2/Z_0 \quad \text{[Formula 1]}$$

$C_{00\_0}$, $C_{01\_0}$ are the electrostatic capacitances between the adjacent first electrodes 34 and the second electrode 36 when normal load Fz' is not applied, and K1, K2 are constants.

A formula similar to Formula 1 is established also for the electrostatic capacitances between the other adjacent first electrodes 34 and the second electrode 36.

(When Only Normal Load Fz' is Applied: Δx, Δy=0, Δz≠0)

As illustrated in FIG. 10(B) and FIG. 11(B), when only the normal load Fz' is applied, Δx, Δy=0, and Δz≠0, and Formula 2 is established for the first electrodes 34 that are adjacent to one another and partially overlap with the second electrode 36.

$$C_{00\_z}=K1/(Z_0-\Delta z)$$

$$C_{01\_z}=K2/(Z_0-\Delta z) \quad \text{[Formula 2]}$$

$C_{00\_z}$, $C_{01\_z}$ are the electrostatic capacitances between the adjacent first electrodes 34 and the second electrode 36 when only the normal load Fz' is applied.

The following are determined from Formula 2.

$$C_{00\_z}/K1=1/(Z_0-\Delta z)$$

$$Z_0-\Delta z=K1/C_{00\_z}$$

$$\Delta z=Z_0-K1/C_{00\_z}$$

From Formula 1, the displacement Δz of the second electrode 36 with respect to one first electrode 34 is determined as follows.

$$Z_0=K1/C_{00\_0}$$

$$\therefore \Delta z=K1(1/C_{00\_0}-1/C_{00\_z})$$

Similarly, the displacement Δz of the second electrode 36 with respect to the other first electrode 34 is determined as follows.

$$\Delta z=K2(1/C_{01\_0}-1/C_{01\_z})$$

The displacement Δz of the second electrode 36 with respect to the other first electrodes 34 is determined in the same way as described above.

(When Only Shearing Force Fx is Applied: Δy, Δz=0, Δx≠0)

As illustrated in FIG. 10(C), when only the shearing force Fx is applied, Δy, Δz=0, and Δx≠0, and Formula 3 is established for the first electrodes 34 that are adjacent to one another and partially overlap with the second electrode 36.

$$C_{00\_x}=K1/Z_0+\Delta x\cdot Kp/Z_0$$

$$C_{01\_x}=K2/Z_0-\Delta x\cdot Kp/Z_0 \quad \text{[Formula 3]}$$

$C_{00\_x}$, $C_{01\_x}$ are the electrostatic capacitances between the first electrodes 34 that are adjacent to one another in the x direction and the second electrode 36 when only the shearing force Fx is applied, and Kp is a constant.

The following are determined from Formula 3.

$$\Delta x\cdot Kp/Z_0=C_{00\_x}-K1/Z_0$$

$$\Delta x\cdot Kp=Z_0\cdot C_{00\_x}-K1$$

$$\Delta x=(Z_0\cdot C_{00\_x}-K1)/Kp$$

From Formula 1, because $K1=Z_0\times C_{00\_0}$, the displacement Δx of the second electrode 36 with respect to one first electrode 34 is determined as follows.

$$\Delta x=(Z_0\cdot C_{00\_x}-Z_0\times C_{00\_0})/Kp$$

$$\Delta x=Z_0/Kp\times(C_{00\_x}-C_{00\_0})$$

Similarly, the displacement Δx of the second electrode 36 with respect to the other first electrode 34 is determined as follows.

$$\Delta x=Z_0/Kp\times(C_{01\_0}-C_{01\_x})$$

The displacement Δx of the second electrode 36 with respect to the other first electrodes 34 is determined in the same way as described above.

(When Only Shearing Force Fy is Applied: Δx, Δz=0, Δy≠0)

As shown in FIG. 11(C), when only the shearing force Fy is applied, the displacement Δy of the second electrode 36 with respect to the first electrode 34 is determined by calculation that is similar to when only the shearing force Fx is applied.

(when Normal Load Fz' and Only Shearing Force Fx are Applied: Δy=0, Δx, Δz≠0)

As illustrated in FIG. 10(D), when the normal load Fz' and only the shearing force Fx are applied, Δy=0, and Δx, Δz≠0, and Formula 4 is established for the first electrodes 34 that are adjacent to one another and partially overlap with the second electrode 36.

$$C_{00\_zx}=K1/(Z_0-\Delta z)+\Delta x\cdot Kp/(Z_0-\Delta z)$$

$$C_{01\_zx}=K2/(Z_0-\Delta z)+\Delta x\cdot Kp/(Z_0-\Delta z) \quad \text{[Formula 4]}$$

$C_{00\_zx}$, $C_{01\_zx}$ are the electrostatic capacitances between the first electrodes 34 and the second electrode 36 when the normal load Fz' and only the shearing force Fx are applied.

From Formula 4, the displacements Δz, Δx of the second electrode 36 with respect to the first electrode 34 are determined as follows.

$$\Delta z=(K1+K2)\{1/(C_{00\_0}+C_{01\_0})-1/(C_{00\_zx}+C_{01\_zx})\}$$

$$\Delta x=(K1+K2)/2Kp\cdot(C_{00\_zx}-C_{01\_zx})/(C_{00\_zx}+C_{01\_zx})$$

The displacements Δz, Δx of the second electrode 36 with respect to the other first electrode 34 are determined in the same way as described above.

(When Normal Load Fz' and Only Shearing Force Fy are Applied: Δx=0, Δy, Δz≠0)

As illustrated in FIG. 11(D), when the normal load Fz' and only the shearing force Fy are applied, the displacements Δz, Δy of the second electrode 36 with respect to the first electrodes 34 that are adjacent to one another are determined by calculation that is similar to when the normal load Fz' and only the shearing force Fx are applied.

(When Normal Load Fz' and Shearing Forces Fx, Fy are Applied: Δx, Δy, Δz≠0)

When the normal load Fz' and the shearing forces Fx, Fy are applied, the displacements Δx, Δy, Δz of the second electrode 36 with respect to the first electrode 34 can be determined as follows. In the range of the four first electrodes 34 that partially overlap with the one second electrode 36, it is often the case that the values of the displacement Δz at the respective first electrodes 34 approximate one another, and therefore, it is assumed that the value of the displacement Δz can be used in common therefor. In this case, the magnitude of the signal (the electrostatic capacitance value) corresponding to each first electrode 34 is proportional to the surface area of overlapping of the first electrode 34 with the second electrode 36. Accordingly, the ratio of electrostatic capacitance values $C_{00}$, $C_{01}$, $C_{10}$, $C_{11}$ is equal to the ratio of overlapping surface areas $S_{00}$, $S_{01}$, $S_{10}$, $S_{11}$. Namely, Formula 5 is established.

$$C_{00}:C_{01}:C_{10}:C_{11}=S_{00}:S_{01}:S_{10}:S_{11} \quad \text{[Formula 5]}$$

Given that the square root of the overlapping surface area in the unloaded state is a, the overlapping surface areas $S_{00}$, $S_{01}$, $S_{10}$, $S_{11}$ are expressed by Formula 6.

$$S_{00}=(a-\Delta x)\times(a-\Delta y), S_{01}=(a-\Delta x)\times(a+\Delta y), S_{10}=(a+\Delta x)\times(a-\Delta y), S_{11}=(a+\Delta x)\times(a+\Delta y) \quad \text{[Formula 6]}$$

From Formula 6, the sum of the four overlapping surface areas is $4a^2$ and is a constant. Accordingly, the overlapping surface areas $S_{00}$, $S_{01}$, $S_{10}$, $S_{11}$ become known values from Formula 5 and the sum $4a^2$ of the four overlapping surface areas. Due to the above, the unknown displacements $\Delta x$, $\Delta y$ can be calculated from the simultaneous equations of Formula 6.

If the displacements $\Delta x$, $\Delta y$ are calculated, by using these as known values, the displacement $\Delta z$ that is assumed to be a common value may be corrected to the individual displacements $\Delta z$ at the respective first electrodes 34. This correction can be carried out by, for example, acquiring in advance and utilizing correlations between the displacements $\Delta x$, $\Delta y$ and the four displacements $\Delta z$ in an environment in which true values of the four displacements $\Delta z$ can be measured by another means. The acquisition of the correlations may be carried out by machine learning.

In a case in which it is known that the four electrostatic capacitance values corresponding to the respective first electrodes 34 are approximately equal, i.e., that the displacements $\Delta x$ and the displacements $\Delta y$ are near zero, the displacements $\Delta z$ at the four first electrodes 34 may be calculated individually by the above method that was described for the case in which $\Delta x$, $\Delta y=0$ and $\Delta z \neq 0$. The case in which $\Delta x$, $\Delta y=0$ and $\Delta z \neq 0$ is a case in which, for example, the workpiece W that is in a state of being placed on a stand is grasped, and the weight of the workpiece W is not being applied to the contacting surface 28. When, from this state, the workpiece W is lifted-up from the stand, mainly the displacements $\Delta x$, $\Delta y$ change while the displacement $\Delta z$ hardly changes at all. Therefore, the displacement $\Delta z$ is treated as a known value, and the displacements $\Delta x$, $\Delta y$ can be determined more accurately.

In the present specification, "calculating the respective pressure values of the plurality of pressure detecting positions" includes, in a case of assuming that the displacement $\Delta z$ is common at plural pressure detecting positions such as the four first electrodes 34, treating the pressure value, which is based on the common displacement $\Delta z$ that is calculated, as the pressure value at the respective pressure detecting positions. Further, "calculating an aggregate pressure value by carrying out calculation of a representative value of the respective pressure values of the plurality of pressure detecting positions" includes, in a case of assuming that the displacement $\Delta z$ is common at plural pressure detecting positions such as the four first electrodes 34, calculating the aggregate pressure value by using the pressure value, which is based on the common displacement $\Delta z$ that is calculated, as a representative value.

As described above, on the basis of the plural signals that respectively correspond to the plural first electrodes 34 that include at least one partially-overlapping electrode that is the first electrode 34 that partially overlaps the second electrode 36, the output section 12 calculates the respective shearing force Fx, Fy values so as to eliminate the effects of pressure on the plural signals.

Operation and effects of the first embodiment are described next.

At the tactile sensor 10 (see FIG. 3 through FIG. 7), the second electrode layer 26 is configured by the plural second electrodes 36 in a single layer. Accordingly, the structure and the manufacturing processes of the tactile sensor 10 can be simplified.

Further, pressure can be detected at the respective positions of the plural first electrodes 34 by detecting the electrostatic capacitances that change in accordance with the distance between the first electrodes 34 and the second electrodes 36. Moreover, the respective second electrodes 36 partially overlap with the respective four first electrodes 34 that are adjacent in the X-axis direction and the Y-axis direction. Therefore, also the shearing forces at the positions of the respective second electrodes 36 can be detected by detecting the electrostatic capacitances that change in accordance with the overlapping surface areas of these four first electrodes 34 and the second electrode 36.

Moreover, due to the number of the plural second electrodes 36 being less than the number of the plural first electrodes 34, the plural first electrodes 34 correspond to the one second electrode 36. Therefore, the intervals between the plural first electrodes 34 can be narrowed as compared with a case in which, for example, the plural first electrodes 34 and the plural second electrodes 36 are in a one-to-one correspondence. Due thereto, because the number of the plural first electrodes 34 can be ensured, the resolution of the pressure distribution can be ensured.

In this way, in accordance with the tactile sensor 10 relating to the first embodiment, shearing forces can be detected, and the resolution of the pressure distribution can be ensured, even by a simple structure and simple manufacturing processes.

Modified examples of the first embodiment are described next.

The tactile sensor 10 has the 36 first electrodes 34, but the number of the plural first electrodes 34 may be any number.

The number of the plural second electrodes 36 may be any number, provided that it is less than the number of the plural first electrodes 34.

The plural first electrodes 34 are preferably arrayed in the form of a matrix along the contacting surface 28. However, the first electrodes may be disposed in a form other than a matrix form, provided that the desired pressure distribution is obtained within the contacting surface 28.

Second Embodiment

A second embodiment is described next.
(Structure of Tactile Sensor 10)

Figure 12:
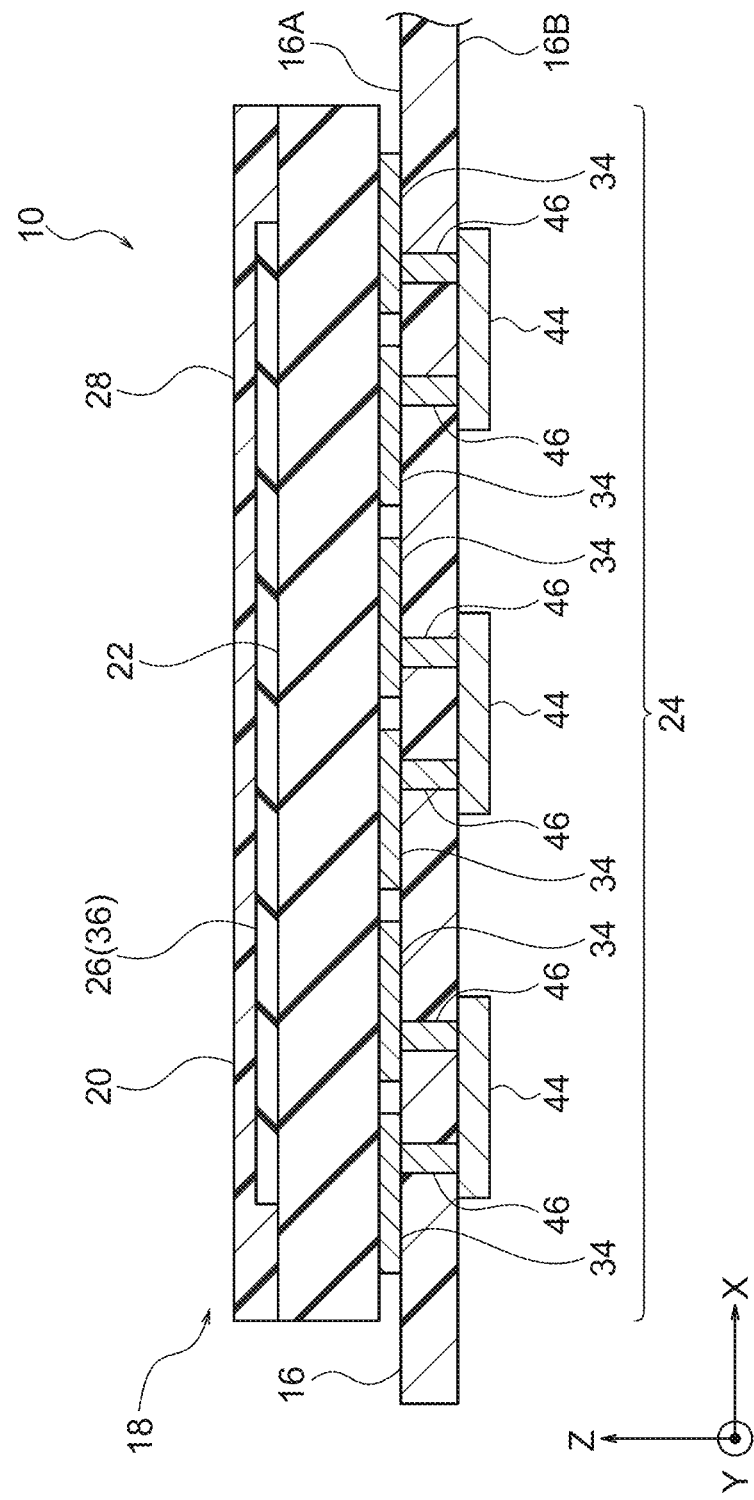
FIG. 12 is a vertical sectional view of the tactile sensor relating to a second embodiment.

FIG. 12 is a vertical sectional view of the tactile sensor 10 relating to a second embodiment. In the tactile sensor 10 relating to the second embodiment, the structure of the second electrode layer 26 is changed as follows with respect to that of the tactile sensor 10 relating to the above-described first embodiment (see FIG. 3 through FIG. 6).

FIG. 13 is a plan view of the second electrode layer 26 of FIG. 12. The second electrode layer 26 is configured by the one second electrode 36 that is a single layer. Namely, the second electrode 36 forms a single island portion. The second electrode 36 is formed of a conductive rubber for example. This second electrode 36 is formed in the shape of a flat plate. The second electrode 36 may be connected to the ground of the substrate 16, or may be floating with respect to ground.

FIG. 14 is a plan view illustrating a state in which the second electrode 36 and the elastic layer 22 and the substrate 16 of FIG. 12 are superposed. As example, the number of the plural first electrodes 34 is 36, whereas the second electrode 36 forms one island portion. Therefore, in the second embodiment, the number of island portions formed by the second electrode 36 is less than the number of the plural first electrodes 34.

As an example, the second electrode 36 is formed in the shape of a square that is smaller than the contacting surface 28 (see FIG. 12). This second electrode 36 is a size that overlaps all of the plural first electrodes 34 as viewed in plan view. Specifically, the second electrode 36 is a size such that the first electrodes 34, which are lined-up along the outer peripheral portion of the second electrode 36 among the plural first electrodes 34, and the outer peripheral portion of the second electrode 36 overlap as viewed in a plan view. Due thereto, the first electrodes 34 that are lined-up along the outer peripheral portion of the second electrode 36 partially overlap with the second electrode 36 as viewed in a plan view. Among the plural first electrodes 34, the first electrodes 34 that are positioned at the inner side of the outer peripheral portion of the second electrode 36 entirely overlap the second electrode 36.

In the second embodiment, among the plural first electrodes 34, the first electrodes 34 that partially overlap with the second electrode 36 correspond to an example of the "plurality of partially-overlapping electrodes that partially overlap with the second electrode", and the plural signals outputted from these first electrodes 34 that partially overlap with the second electrode 36 correspond to an example of the "plurality of partially-overlapping electrode signals".

At the sensor portion 18 of the tactile sensor 10 illustrated in FIG. 12, when pressure is applied to the contacting surface 28, and the distance d between each first electrode 34 and the second electrode 36 changes, the electrostatic capacitance C changes in accordance with this change in the distance d. Further, at the sensor portion 18, when shearing force is applied to the contacting surface 28, and the surface area A over which the first electrode 34 (see FIG. 14), which partially overlaps the second electrode 36, and the second electrode 36 overlap one another changes, the electrostatic capacitance C changes in accordance with this change in the surface area A.

The tactile sensor 10 of this structure is manufactured in the same way as the tactile sensor 10 relating to the above-described first embodiment (see FIG. 3 through FIG. 6).

Further, in the second embodiment, the calculation of the displacements Δx, Δy, Δz is carried out on the basis of an approach similar to that of the case of the first embodiment.

Operation and effects of the second embodiment are described next.

In the tactile sensor 10 (see FIG. 12 through FIG. 14), the second electrode layer 26 is configured by the one second electrode 36 that is a single layer. Accordingly, the structure and the manufacturing processes of the tactile sensor 10 can be simplified.

Further, pressure can be detected at the respective positions of the plural first electrodes 34 by detecting the electrostatic capacitances that change in accordance with the distances between the first electrodes 34 and the second electrode 36. Moreover, some of the plural first electrodes 34, i.e., the first electrodes 34 that are lined-up along the outer peripheral portion of the second electrode 36, partially overlap with the second electrode 36 as viewed in a plan view. Therefore, also the shearing forces at the positions of the respective first electrodes 34, which are lined-up along the outer peripheral portion of the second electrode 36, can be detected by detecting the electrostatic capacitances that change in accordance with the overlapping surface areas of these first electrodes 34 and the second electrode 36.

Moreover, due to the number of the second electrodes 36 being one and being less than the number of the plural first electrodes 34, the plural first electrodes 34 correspond to the one second electrode 36. Therefore, the intervals between the plural first electrodes 34 can be narrowed as compared with a case in which, for example, the plural first electrodes 34 and the plural second electrodes 36 are in a one-to-one correspondence. Due thereto, because the number of the plural first electrodes 34 can be ensured, the resolution of the pressure distribution can be ensured.

In this way, in accordance with the tactile sensor 10 relating to the second embodiment, shearing forces can be detected, and the resolution of the pressure distribution can be ensured, even by a simple structure and simple manufacturing processes.

Further, because the second electrode 36 is a single structure, as compared with a case in which the second electrode 36 is configured by plural members for example, the manufacturing efficiency can be improved, and the number of parts can be reduced.

Modified examples of the second embodiment are described next.

The tactile sensor 10 has the 36 first electrodes 34, but the number of the plural first electrodes 34 may be any number.

Although there is the one second electrode 36, the number of the second electrodes 36 may be any number provided that it is less than the number of the plural first electrodes 34.

The plural first electrodes 34 are preferably arrayed in the form of a matrix along the contacting surface 28. However, the first electrodes may be disposed in a form other than a matrix form, provided that the desired pressure distribution is obtained within the contacting surface 28.

Third Embodiment

A third embodiment is described next.
(Structure of Tactile Sensor 10)

FIG. 15 is a vertical sectional view of the tactile sensor 10 relating to a third embodiment. In the tactile sensor 10 relating to the third embodiment, the structure of the second electrode layer 26 is changed as follows with respect to that of the tactile sensor 10 relating to the above-described first embodiment (see FIG. 3 through FIG. 6).

FIG. 16 is a plan view of the second electrode layer 26 of FIG. 15. The second electrode layer 26 is configured by the one second electrode 36 that is a single layer. The second electrode 36 is formed from a conductive rubber for example. This second electrode 36 is formed in the shape of a flat plate. As an example, the second electrode 36 is formed in a square shape as viewed in plan view. The second electrode 36 may be connected to the ground of the substrate 16 (see FIG. 3), or may be floating with respect to ground.

The plural openings 38 are formed in the second electrode 36. The plural openings 38 pass-through in the plate thickness direction of the second electrode 36, i.e., the Z-axis direction. The plural openings 38 are arrayed in the form of a matrix along the X-Y plane. Namely, the plural openings 38 are arrayed with the X-axis direction being the length direction and the Y-axis direction being the width direction.

The plural openings 38 are the same shape, and, as an example, the plural openings 38 are formed in square shapes as viewed in plan view. The number of the plural openings 38 is less than the number of the above-described, plural first electrodes 34 (see FIG. 4). As an example, the plural openings 38 are arrayed such that there are three thereof in the X-axis direction and three thereof in the Y-axis direction. Namely, the number of the plural openings 38 is nine. These plural openings 38 are arrayed at uniform intervals in the X-axis direction and the Y-axis direction, respectively.

FIG. 17 is a plan view illustrating a state in which the second electrode 36 and the elastic layer 22 and the substrate 16 of FIG. 15 are superposed. The second electrode 36 is a size that overlaps all of the plural first electrodes 34 as viewed in plan view. Specifically, the second electrode 36 is a size that is such that all of the plural first electrodes 34 are contained at the inner side of the outer shape of the second electrode 36 as viewed in plan view.

The plural openings 38 are respectively formed so as to partially overlap with the respective four first electrodes 34 that are adjacent in the X-axis direction and the Y-axis direction, among the plural first electrodes 34, as viewed in plan view. Specifically, as viewed in plan view, each of the openings 38 is positioned at the central portion of four of the first electrodes 34, and partially overlaps these four first electrodes 34.

In this way, in the third embodiment, all of the plural first electrodes 34 are contained at the inner side of the outer shape of the second electrode 36 as viewed in a plan view, and further, all of the plural first electrodes 34 partially overlap with the openings 38. All of the plural first electrodes 34 partially overlapping the openings 38 corresponds to all of the plural first electrodes 34 partially overlapping the second electrode 36.

In the third embodiment, all of the plural first electrodes 34 correspond to an example of "plurality of partially-overlapping electrodes that partially overlap with the second electrode", and the plural signals that are outputted from the plural first electrodes 34 correspond to an example of the "plurality of partially-overlapping electrode signals".

In the sensor portion 18 of the tactile sensor 10 illustrated in FIG. 15, when pressure is applied to the contacting surface 28, and the distance d between each first electrode 34 and the second electrode 36 changes, the electrostatic capacitance C changes in accordance with this change in the distance d. Further, at the sensor portion 18, when shearing force is applied to the contacting surface 28, and the surface area A over which each first electrode 34 and the second electrode 36 overlap one another changes, the electrostatic capacitance C changes in accordance with this change in the surface area A.

The tactile sensor 10 of this structure is manufactured in the same way as the tactile sensor 10 relating to the above-described first embodiment (see FIG. 3 through FIG. 6).

Further, in the third embodiment, the calculation of the displacements $\Delta x$, $\Delta y$, $\Delta z$ is carried out on the basis of an approach similar to that of the case of the first embodiment.

Operation and effects of the third embodiment are described next.

In the tactile sensor 10 (see FIG. 15 through FIG. 17), the second electrode layer 26 is configured by the one second electrode 36 that is a single layer. Accordingly, the structure and the manufacturing processes of the tactile sensor 10 can be simplified.

Further, pressure can be detected at the respective positions of the plural first electrodes 34 by detecting the electrostatic capacitances that change in accordance with the distances between the first electrodes 34 and the openings 38. Moreover, because each of the openings 38 partially overlaps the respective, four first electrodes 34 that are adjacent in the X-axis direction and the Y-axis direction, also the shearing forces at the positions of the respective openings 38 can be detected by detecting the electrostatic capacitances that change in accordance with the overlapping surface areas of these four first electrodes 34 and the plural openings 38.

Moreover, due to the number of the openings 38 that are formed in the second electrode 36 being less than the number of the plural first electrodes 34, the plural first electrodes 34 correspond to the one opening 38. Therefore, the intervals between the plural first electrodes 34 can be narrowed as compared with a case in which, for example, the plural first electrodes 34 correspond one-to-one to the plural openings 38. Due thereto, because the number of the plural first electrodes 34 can be ensured, the resolution of the pressure distribution can be ensured.

In this way, in accordance with the tactile sensor 10 relating to the third embodiment, shearing forces can be detected, and the resolution of the pressure distribution can be ensured, even by a simple structure and simple manufacturing processes.

Further, because the second electrode 36 is a single structure that has the plural openings 38, as compared with a case in which the second electrode 36 is configured by plural members for example, the manufacturing efficiency can be improved, and the number of parts can be reduced.

The tactile sensor 10 has the 36 first electrodes 34, but the number of the plural first electrodes 34 may be any number.

The number of the second electrodes 36 may be any number provided that it is less than the number of the plural first electrodes 34.

The plural first electrodes 34 are preferably arrayed in the form of a matrix along the contacting surface 28. However, the first electrodes may be disposed in a form other than a matrix form, provided that the desired pressure distribution is obtained within the contacting surface 28.

Fourth Embodiment

A fourth embodiment is described next.
(Structure of Tactile Sensor 10)

FIG. 18 is a vertical sectional view of the tactile sensor 10 relating to a fourth embodiment. In the tactile sensor 10 relating to the fourth embodiment, the structure of the second electrode layer 26 is changed as follows with respect to that of the tactile sensor 10 relating to the above-described first embodiment (see FIG. 3 through FIG. 6).

Figure 19:
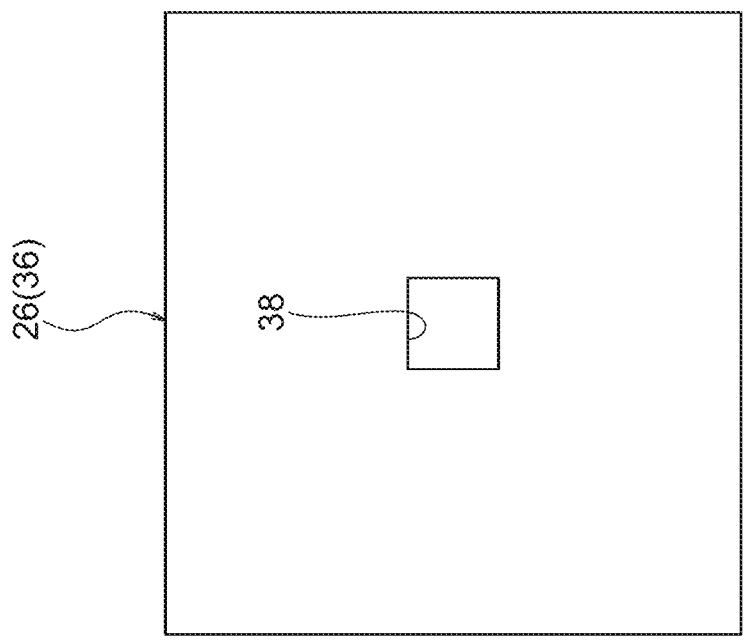
FIG. 19 is a plan view of the second electrode layer of FIG. 18.

FIG. 19 is a plan view of the second electrode layer 26 of FIG. 18. The second electrode layer 26 is configured by the one second electrode 36 that is a single layer. The second electrode 36 is formed in the shape of a flat plate. The second electrode 36 may be connected to the ground of the substrate 16, or may be floating with respect to ground. The second electrode 36 is formed of a conductive rubber for example.

One opening 38 is formed in the second electrode 36. As an example, the opening is formed in the central portion of the second electrode 36. The second electrode 36 is formed in a square shape as viewed in plan view, and the opening 38 also is formed in a square shape as viewed in plan view.

FIG. 20 is a plan view illustrating a state in which the second electrode 36 and the elastic layer 22 and the substrate 16 of FIG. 18 are superposed. As an example, the number of the plural first electrodes 34 is 36, whereas the one opening 38 is formed in the second electrode 36. Therefore, in the fourth embodiment, the number of the openings 38 formed in the second electrode 36 is less than the number of the plural first electrodes 34.

The second electrode 36 is a size that overlaps all of the plural first electrodes 34 as viewed in plan view. Specifically, the second electrode 36 is a size that is such that all of the plural first electrodes 34 are contained at the inner side of the outer shape of the second electrode 36 as viewed in plan view.

As an example, the opening 38 is formed in the shape of a square that is smaller than the minimum square that contains all of the central, four first electrodes 34 that are adjacent in the X-axis direction and the Y-axis direction, as viewed in plan view. The opening 38 is positioned at the central portion of the central, four first electrodes 34 as viewed in plan view, and partially overlaps these four first electrodes 34. Due thereto, among the plural first electrodes 34, the central, four first electrodes 34 partially overlap with the second electrode 36 as viewed in plan view. Among the plural first electrodes 34, the first electrodes 34 that are other than the central, four first electrodes 34 completely overlap the second electrode 36.

In the second embodiment, the central, four first electrodes 34 among the plural first electrodes 34 correspond to an example of the "plurality of partially-overlapping electrodes that partially overlap with the second electrode", and the plural signals outputted from these central, four first electrodes correspond to an example of the "plurality of partially-overlapping electrode signals".

The tactile sensor 10 of this structure is manufactured in the same way as the tactile sensor 10 relating to the above-described first embodiment (see FIG. 3 through FIG. 6).

In the fourth embodiment, the calculation of the displacements Δx, Δy, Δz is carried out on the basis of an approach similar to that of the case of the first embodiment.

Operation and effects of the fourth embodiment are described next.

In the tactile sensor 10 (see FIG. 18 through FIG. 20), the second electrode layer 26 is configured by the one second electrode 36 that is a single layer. Accordingly, the structure and the manufacturing processes of the tactile sensor 10 can be simplified.

Further, pressure can be detected at the respective positions of the plural first electrodes 34 by detecting the electrostatic capacitances that change in accordance with the distances between the first electrodes 34 and the second electrode 36. Moreover, the central, four first electrodes 34 among the plural first electrodes 34 partially overlap with the opening 38 that is formed in the center of the second electrode 36 as viewed in plan view. Therefore, also the shearing forces at the position of the opening 38 can be detected by detecting the electrostatic capacitances that change in accordance with the overlapping surface areas of these four first electrodes 34 and the second electrode 36.

Moreover, due to the number of the openings 38 that are formed in the second electrode 36 being one and being less than the number of the plural first electrodes 34, the plural first electrodes 34 correspond to the one opening 38. Therefore, the intervals between the plural first electrodes 34 can be narrowed as compared with a case in which, for example, the plural first electrodes 34 correspond one-to-one to the plural openings 38. Due thereto, because the number of the plural first electrodes 34 can be ensured, the resolution of the pressure distribution can be ensured.

In this way, in accordance with the tactile sensor 10 relating to the fourth embodiment, shearing forces can be detected, and the resolution of the pressure distribution can be ensured, even by a simple structure and simple manufacturing processes.

Further, because the second electrode 36 is a single structure, as compared with a case in which the second electrode 36 is configured by plural members for example, the manufacturing efficiency can be improved, and the number of parts can be reduced.

Modified examples of the fourth embodiment are described next.

The tactile sensor 10 has the 36 first electrodes 34, but the number of the plural first electrodes 34 may be any number.

Although the one opening 38 is formed in the second electrode 36, the number of the openings 38 may be any number provided that the number of the openings 38 is less than the number of the plural first electrodes 34.

The plural first electrodes 34 are preferably arrayed in the form of a matrix along the contacting surface 28. However, the first electrodes may be disposed in a form other than a matrix form, provided that the desired pressure distribution is obtained within the contacting surface 28.

Although first through fourth embodiments of the technique disclosed in the present application have been described above, the technique disclosed in the present application is not limited to the above, and can of course be implemented by being modified in various ways, other than the above, within a scope that does not depart from the gist thereof.

Note that the disclosure of Japanese Patent Application No. 2020-140395 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A tactile sensor, comprising an electrostatic capacitance-type sensor portion having a contacting surface that contacts an object, and having a layered structure in which an elastic layer, and a first electrode layer and a second electrode layer positioned at respective sides of the elastic layer with the elastic layer sandwiched therebetween, are layered in a normal direction of the contacting surface, wherein:
   the first electrode layer has a plurality of first electrodes,
   the second electrode layer is configured by one second electrode in a single layer in which a plurality of openings are formed,
   two or more of the plurality of first electrodes are partially-overlapping electrodes that partially overlap with the second electrode as viewed in the normal direction,
   a number of the plurality of openings is less than a number of the plurality of first electrodes, and
   each of the plurality of the openings partially overlaps respective adjacent first electrodes among the plurality of first electrodes as viewed in the normal direction.

2. The tactile sensor of claim 1, wherein the second electrode is formed from a conductive rubber.

3. The tactile sensor of claim 1, wherein the plurality of openings are formed n the second electrode.

4. The tactile sensor of claim 1, wherein the plurality of openings comprises an array of openings.

5. The tactile sensor of claim 1, wherein each opening of the plurality of openings has the same shape.

6. The tactile sensor of claim 1, further comprising a substrate, wherein the second electrode is connected to a ground connection of the substrate.

7. The tactile sensor of claim 1, further comprising a substrate, wherein the second electrode is floating with respect to a ground connection of the substrate.

* * * * *